US010989992B2

(12) United States Patent
Nemura et al.

(10) Patent No.: US 10,989,992 B2
(45) Date of Patent: Apr. 27, 2021

(54) ADJUSTING MECHANISM AND PROJECTOR

(71) Applicant: SEIKO EPSON CORPORATION, Tokyo (JP)

(72) Inventors: Akira Nemura, Azumino (JP); Yutaka Arakawa, Suwa-Gun Hara-Mura (JP); Tomohisa Iwazaki, Suwa-Gun Shimosuwa-Machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/798,542

(22) Filed: Feb. 24, 2020

(65) Prior Publication Data

US 2020/0272035 A1 Aug. 27, 2020

(30) Foreign Application Priority Data

Feb. 25, 2019 (JP) .............................. JP2019-031328
Feb. 25, 2019 (JP) .............................. JP2019-031329
Feb. 25, 2019 (JP) .............................. JP2019-031330

(51) Int. Cl.
*G03B 21/14* (2006.01)
*G03B 3/04* (2021.01)
*G03B 21/00* (2006.01)
*G03B 21/53* (2006.01)

(52) U.S. Cl.
CPC ............. *G03B 21/145* (2013.01); *G03B 3/04* (2013.01); *G03B 21/142* (2013.01); *G03B 21/147* (2013.01); *G03B 21/006* (2013.01); *G03B 21/53* (2013.01)

(58) Field of Classification Search
CPC ...... G03B 21/145; G03B 21/147; G03B 3/04; G03B 21/142; G03B 21/53
See application file for complete search history.

(56) References Cited

U.S. PATENT DOCUMENTS

| 5,800,032 | A * | 9/1998 | Uchiyama | G03B 21/145 348/E5.141 |
| 6,361,171 | B1 * | 3/2002 | Ejiri | G03B 21/14 348/744 |
| 6,609,797 | B2 * | 8/2003 | Ejiri | G03B 21/14 348/744 |

(Continued)

FOREIGN PATENT DOCUMENTS

JP 2003-098599 A 4/2003

*Primary Examiner* — Bao-Luan Q Le
(74) *Attorney, Agent, or Firm* — Oliff PLC

(57) ABSTRACT

An adjusting mechanism for adjusting a position of a display panel includes a first plate including a placing portion on which the display panel is placed, a second plate on which the first plate is placed, the second plate disposed on the opposite side of a display panel side with respect to the first plate, a third plate on which the second plate is placed, the third plate disposed on an opposite side of a first plate side with respect to the second plate, a first position adjusting actuator configured to move the first plate in a direction along a Z axis, a θx direction, and a θy direction, a second position adjusting actuator configured to move the second plate in a direction along an X axis and a θz direction, and a third position adjusting actuator configured to move the third plate in a direction along the Y axis.

20 Claims, 14 Drawing Sheets

(56) References Cited

U.S. PATENT DOCUMENTS

| | | | | |
|---|---|---|---|---|
| 6,830,341 B2* | 12/2004 | Ejiri | | G03B 21/14 |
| | | | | 353/69 |
| 7,182,464 B2* | 2/2007 | Ejiri | | G03B 21/14 |
| | | | | 348/E17.005 |
| 7,237,903 B2* | 7/2007 | Nagayoshi | | G09G 3/2092 |
| | | | | 348/747 |
| 7,824,039 B2* | 11/2010 | Takito | | H04N 9/3185 |
| | | | | 353/69 |
| 7,946,714 B2* | 5/2011 | Kawakami | | G03B 21/005 |
| | | | | 353/69 |
| 8,152,313 B2* | 4/2012 | Amano | | G03B 3/00 |
| | | | | 353/101 |
| 8,220,937 B2* | 7/2012 | Amano | | G03B 5/04 |
| | | | | 353/70 |
| 8,226,248 B2* | 7/2012 | Amano | | G03B 21/142 |
| | | | | 353/119 |
| 8,537,288 B2* | 9/2013 | Hayashi | | G02F 1/1313 |
| | | | | 349/5 |
| 8,879,007 B2* | 11/2014 | Hayashi | | H04N 9/317 |
| | | | | 349/5 |
| 9,864,262 B2* | 1/2018 | Fujioka | | H04N 9/3188 |
| 9,952,486 B2* | 4/2018 | Mikawa | | H04N 9/3141 |
| 10,091,472 B2* | 10/2018 | Mikawa | | H04N 9/3144 |
| 10,197,894 B2* | 2/2019 | Yamada | | G03B 21/145 |
| 10,216,074 B2* | 2/2019 | Mikawa | | H04N 9/3135 |
| 10,225,531 B2* | 3/2019 | Yamada | | H04N 9/315 |
| 10,230,930 B2* | 3/2019 | Ohno | | G09G 3/002 |
| 10,250,854 B2* | 4/2019 | Ohno | | H04N 9/3188 |
| 10,354,572 B2* | 7/2019 | Mikawa | | H04N 9/3144 |
| 10,393,547 B2* | 8/2019 | Kubota | | G01D 5/145 |
| 2002/0001067 A1* | 1/2002 | Tachibana | | G03B 21/145 |
| | | | | 353/101 |
| 2002/0089651 A1* | 7/2002 | Ejiri | | H04N 9/3185 |
| | | | | 353/69 |
| 2003/0206277 A1* | 11/2003 | Eiiri | | H04N 17/04 |
| | | | | 353/31 |
| 2005/0062940 A1* | 3/2005 | Ejiri | | H04N 5/74 |
| | | | | 353/69 |
| 2005/0168698 A1* | 8/2005 | Nagayoshi | | H04N 9/317 |
| | | | | 353/30 |
| 2008/0111976 A1* | 5/2008 | Takito | | G03B 21/13 |
| | | | | 353/121 |
| 2008/0180639 A1* | 7/2008 | Amano | | G03B 5/04 |
| | | | | 353/24 |
| 2008/0231813 A1* | 9/2008 | Kawakami | | G02B 13/16 |
| | | | | 353/70 |
| 2009/0279055 A1* | 11/2009 | Amano | | G03B 3/00 |
| | | | | 353/101 |
| 2010/0171938 A1* | 7/2010 | Amano | | G03B 5/02 |
| | | | | 353/119 |
| 2010/0265419 A1* | 10/2010 | Hayashi | | G03B 3/00 |
| | | | | 349/5 |
| 2013/0300951 A1* | 11/2013 | Hayashi | | G02B 7/008 |
| | | | | 349/8 |
| 2016/0154294 A1* | 6/2016 | Fujioka | | G02B 27/0025 |
| | | | | 353/87 |
| 2016/0277716 A1* | 9/2016 | Mikawa | | G02B 26/0833 |
| 2017/0155816 A1* | 6/2017 | Ito | | H04N 5/2328 |
| 2017/0272711 A1* | 9/2017 | Mikawa | | G02B 26/085 |
| 2017/0347070 A1* | 11/2017 | Yamada | | H04N 9/3188 |
| 2017/0363942 A1* | 12/2017 | Hiramatsu | | H04N 9/315 |
| 2018/0115753 A1* | 4/2018 | Ohno | | H04N 9/3188 |
| 2018/0146179 A1* | 5/2018 | Ohno | | G03B 21/145 |
| 2018/0157156 A1* | 6/2018 | Yamada | | H04N 9/3188 |
| 2018/0158387 A1* | 6/2018 | Mikawa | | G02B 26/085 |
| 2018/0160083 A1* | 6/2018 | Mikawa | | H04N 9/3144 |

\* cited by examiner

ADJUSTING MECHANISM AND PROJECTOR

The present application is based on, and claims priority from JP Application Serial Numbers 2019-031328, 2019-031329, and 2019-031330, all filed Feb. 25, 2019, the disclosure of all of which is hereby incorporated by reference herein in its entirety.

BACKGROUND

1. Technical Field

The present disclosure relates to an adjusting mechanism and a projector.

2. Related Art

There has been known a method of adjusting the position of a liquid crystal panel in an optical system of a projector. For example, JP A-2003-98599 (Patent Literature 1) proposes a focus adjusting method for a liquid crystal projector. However, in the focus adjusting method described in Patent Literature 1, although an algorithm of focus adjustment is disclosed, a specific adjusting mechanism is not disclosed. That is, there has been a demand for an adjusting mechanism for adjusting the position of a display panel such as a liquid crystal panel.

SUMMARY

An adjusting mechanism according to an aspect of this application is an adjusting mechanism for adjusting a position of a display panel, the adjusting mechanism including: a first plate including a placing portion on which the display panel is placed; a second plate on which the first plate is placed, the second plate being disposed on an opposite side of a display panel side with respect to the first plate; a third plate on which the second plate is placed, the third plate being disposed on an opposite side of a first plate side with respect to the second plate; a first position adjusting actuator; a second position adjusting actuator; and a third position adjusting actuator. In a state in which the display panel is placed on the placing portion, a surface parallel to a display surface of the display panel is a reference plane, a coordinate axis orthogonal to the reference plane is a Z axis, two coordinate axes orthogonal to each other in the reference plane are an X axis and a Y axis, a rotating direction around the X axis is a θx direction, a rotating direction around the Y axis is a θy direction, and a rotating direction around the Z axis is a θz direction, the first position adjusting actuator is configured to move the first plate in a direction along the Z axis, the θx direction, and the θy direction, the second position adjusting actuator is configured to move the second plate in a direction along the X axis and the θz direction, and the third position adjusting actuator is configured to move the third plate in a direction along the Y axis.

In the adjusting mechanism, the first position adjusting actuator may include a first actuator, a second actuator, and a third actuator, the first actuator may include a first linearly mover configured to linearly move in the direction along the Z axis, the second actuator may include a second linearly mover configured to linearly move in the direction along the Z axis, the third actuator may include a third linearly mover configured to linearly move in the direction along the Z axis, the first actuator may be disposed on one side with respect to the placing portion, and the second actuator and the third actuator may be disposed on another side opposite to a first actuator side with respect to the placing portion.

In the adjusting mechanism, the first linearly mover, the second linearly mover, and the third linearly mover may come into contact with the first plate from the direction along the Z direction.

In the adjusting mechanism, the first actuator, the second actuator, and the third actuator may be disposed to be opposed to one another in the direction along the Y axis across the placing portion, and the first plate may move in the direction along the Z direction when the first linearly mover, the second linearly mover, and the third linearly mover are linearly moved in a same direction along the Z axis.

In the adjusting mechanism, the first plate may move in the θx direction when the second linearly mover and the third linearly mover are relatively linearly moved in a same direction along the Z axis with respect to the first linearly mover.

In the adjusting mechanism, the first plate may move in the θy direction when the second linearly mover is relatively linearly moved along a first direction along the Z direction with respect to the first linearly mover and the third linearly mover is relatively linearly moved along a second direction opposite to the first direction along the Z axis with respect to the first linearly mover.

In the adjusting mechanism, the adjusting mechanism may further include a first elastic member coupling the second plate and the third plate, and the first elastic member may be elastically deformable in the direction along the X axis.

In the adjusting mechanism, the adjusting mechanism may further include: a base on which the third plate is placed, the base being disposed on an opposite side of a second plate side with respect to the third plate; and a second elastic member and a third elastic member which are provided to be opposed to each other in the direction along the Y axis, the second elastic member and the third elastic member being coupling the third plate and the base, and configured to restrict movement of the third plate in the direction along the Y axis with respect to the base.

In the adjusting mechanism, the second position adjusting actuator may include a first actuator and a second actuator, the first actuator may include a first linearly mover configured to linearly move in the direction along the X axis, the second actuator may include a second linearly mover configured to linearly move in the direction along the X axis, and the first linearly mover and the second linearly mover may come into contact with the second plate.

In the adjusting mechanism, the first linearly mover and the second linearly mover may project in the direction along the X axis to press the second plate.

In the adjusting mechanism, the second plate may move in the direction along the X axis when a projection amount of the first linearly mover in the direction along the X axis and a projection amount of the second linearly mover in the direction along the X axis are substantially equal.

In the adjusting mechanism, the second plate may move in the θz direction when a projection amount of the first linearly mover in the direction along the X axis and a projection amount of the second linearly mover in the direction along the X axis are different.

In the adjusting mechanism, the first elastic member may be applied with a preload in the direction along the X axis.

In the adjusting mechanism, the third plate may include a pair of contact portions provided at both ends in the direction along the Y axis, the first elastic member may be a leaf spring, the first elastic member may be coupled to the third plate via the pair of contact portions and coupled to the second plate in a position of the first elastic member between the pair of contact portions in the direction along the Y axis, and the first actuator and the second actuator may be disposed to be opposed to the pair of contact portions and the first elastic member in the direction along the X axis.

A projector according to an aspect of this application includes: a light source; a display panel configured to modulate light emitted from the light source; a projection lens configured to project the light modulated by the display panel; and the adjusting mechanism on which the display panel is placed.

In the projector, a focus of the projection lens with respect to the display panel may be adjusted when the first plate moves in at least one direction among the direction along the Z axis, the θx direction, and the θy direction and changes a position of the display panel with respect to the projection lens.

In the projector, the projector may further include a display panel for green configured to modulate green light as the display panel, a display panel for red configured to modulate red light as the display panel, a display panel for blue configured to modulate blue light as the display panel, an adjusting mechanism for red configured to adjust a position of the display panel for red as the adjusting mechanism, and an adjusting mechanism for blue configured to adjust a position of the display panel for blue as the adjusting mechanism. A position of the display panel for red and a position of the display panel for blue with respect to the display panel for green are determined by changing the position of the display panel for red according to movement of the second plate and the third plate in the adjusting mechanism for red and changing the position of the display panel for blue according to movement of the second plate and the third plate in the adjusting mechanism for blue.

In the projector, the projector may further include a color combination optical system configured to combine lights respectively emitted from the display panel for red, the display panel for green, and the display panel for blue, and, among the first plate, the second plate, and the third plate, the third plate out of the three plates may be located on a nearest side to the color combination optical system and the first plate out of the three plates may be located on a farthest side from the color combination optical system.

An adjusting mechanism according to an aspect of this application is an adjusting mechanism for adjusting a position of a display panel, the adjusting mechanism including: a plate including a placing portion on which the display panel is placed; a first actuator configured to come into contact with the plate and move the plate; a second actuator configured to come into contact with the plate and move the plate; and a third actuator configured to come into contact with the plate and move the plate. The first actuator includes a first linearly mover configured to linearly move in a predetermined direction, the second actuator includes a second linearly mover configured to linearly move in the predetermined direction, the third actuator includes a third linearly mover configured to linearly move in the predetermined direction, the first actuator is disposed on one side with respect to the placing portion, and the second actuator and the third actuator are disposed on another side opposite to the first actuator side with respect to the placing portion.

An adjusting mechanism according to an aspect of this application is an adjusting mechanism for adjusting a position of a display panel, the adjusting mechanism including: a first plate including a placing portion on which the display panel is placed; a second plate on which the first plate is placed, the second plate being disposed on an opposite side of the display panel side with respect to the first plate; a third plate on which the second plate is placed, the third plate being disposed on an opposite side of a first plate side with respect to the second plate; a first position adjusting actuator; a second position adjusting actuator; and a first elastic member coupling the second plate and the third plate. In a display surface of the display panel, two coordinate axes orthogonal to each other are an X axis and a Y axis, a coordinate axis orthogonal to the display surface is a Z axis, and a rotating direction around the Z axis is a θz direction, the first position adjusting actuator moves the second plate in a direction along the X axis and the θz direction, the second position adjusting actuator moves the third plate in a direction along the Y axis, and the first elastic member is elastically deformable in the direction along the X axis.

BRIEF DESCRIPTION OF THE DRAWINGS

FIG. 2 is a perspective view showing disposition of a cross dichroic prism, a display panel, and the like.

DESCRIPTION OF EXEMPLARY EMBODIMENTS

Figure 1:
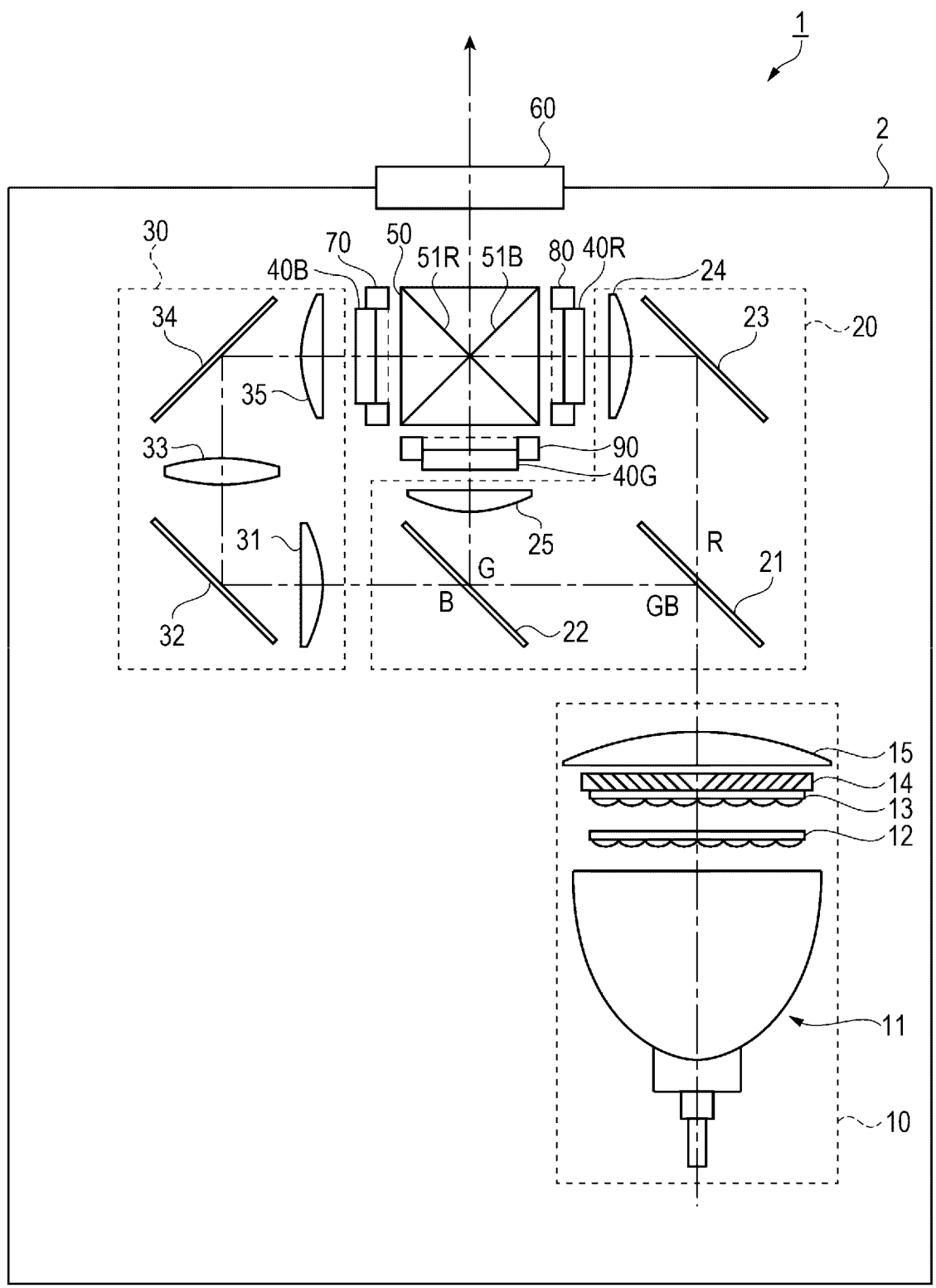
FIG. 1 is a schematic diagram showing the configuration of a projector according to an embodiment.

An embodiment of the present disclosure is explained below with reference to the drawings. The embodiment explained below is explanation of an example of the present disclosure. The present disclosure is not limited to the embodiment explained below. Various modifications implemented in a range in which the gist of the present disclosure is not changed are also included in the present disclosure. In the drawings referred to below, scales of members are differentiated from actual scales in order to show the members in recognizable sizes. In the drawings referred to below, X, Y, and Z axes, which are coordinate axes orthogonal to one another, are added according to necessity.

1. Embodiment

In this embodiment, an adjusting mechanism included in a projector including three liquid crystal panels functioning as display panels is explained as an example. In the adjusting mechanism in this embodiment explained below, a component that adjusts three axes of θx, θy, and Z and a component that adjusts three axes of Y, X, and θz are examples of an adjusting mechanism according to the present disclosure.

1.1. Projector

The configuration of a projector according to this embodiment is explained with reference to FIG. 1. FIG. 1 is a schematic diagram showing the configuration of a projector 1 according to the embodiment.

As shown in FIG. 1, the projector 1 according to this embodiment includes a light source device 10, which is an illumination optical system, a color separation optical system 20, a relay optical system 30, a display panel for green 40G, a display panel for red 40R, and a display panel for blue 40B functioning as three display panels, which are light modulating devices, an adjusting mechanism for blue 70 and an adjusting mechanism for red 80, a cross dichroic prism 50 functioning as a prism, which is a color combination optical system, and a projection lens 60. These are housed in a main body section 2. In the following explanation, the display panel for green 40G, the display panel for red 40R, and the display panel for blue 40B are sometimes collectively simply referred to as display panel 40 as well. Further, the adjusting mechanism for blue 70 on which the display panel for blue 40B is placed and the adjusting mechanism for red 80 on which the display panel for red 40R is placed are sometimes collectively simply referred to as adjusting mechanism 7 as well.

The display panel 40 modulates light emitted from a light source 11 included in the light source device 10. Among a plurality of the display panels 40, the display panel for red 40R is mounted on the adjusting mechanism for red 80 and the position of the display panel for red 40R is adjusted and the display panel for blue 40B is mounted on the adjusting mechanism for blue 70 and the position of the display panel for blue 40B is adjusted. The display panel for green 40G is not mounted on the adjusting mechanism in this embodiment and is mounted on a mounting member 90. The display panel for green 40G modulates green light G, the display panel for red 40R modulates red light R, and the display panel for blue 40B modulates blue light B. The lights modulated by the display panels 40 are combined by the cross dichroic prism 50 and projected onto a projection target such as a not-shown screen from the projection lens 60.

The light source device 10 includes the light source 11, a first lens array 12, a second lens array 13, a polarization converter 14, and a superimposing lens 15. In the first lens array 12 and the second lens array 13, small lenses are arrayed in a matrix shape.

In the projector 1, a light source of a discharge type is adopted as the light source 11. However, the type of the light source 11 is not limited to this. A solid-state light source such as a light emitting diode or a laser may be adopted as the light source 11.

Light emitted from the light source 11 is divided into a plurality of very small partial light beams by the first lens array 12. The polarization converter 14 aligns nonpolarized light emitted from the light source 11 into polarized light usable in the display panel 40. The partial light beams are superimposed on incident surfaces of three display panels 40, which are illumination targets, by the second lens array 13 and the superimposing lens 15. That is, an integrator illumination optical system, in which light emitted from the light source 11 illuminates the display panels 40, is formed by the first lens array 12, the second lens array 13, and the superimposing lens 15.

The color separation optical system 20 includes a first dichroic mirror 21, a second dichroic mirror 22, a reflection mirror 23, and field lenses 24 and 25. The color separation optical system 20 separates light emitted from the light source device 10 into color lights of three colors in wavelength regions different from one another. The color lights of the three colors are the green light G, the red light R, and the blue light B. The green light G is substantially green light, the red light R is substantially red light, and the blue light B is substantially blue light.

The field lens 24 is disposed on an incident surface side of the display panel for red 40R. The field lens 25 is disposed on an incident surface side of the display panel for green 40G.

The first dichroic mirror 21 transmits the red light R and reflects the green light G and the blue light B. The red light R transmitted through the first dichroic mirror 21 is reflected by the reflection mirror 23 and transmitted through the field lens 24 to illuminate the display panel for red 40R.

The field lens 24 condenses the red light R reflected by the reflection mirror 23 and illuminates the display panel for red 40R. Like the field lens 24, the field lens 25 condenses the green light G reflected by the second dichroic mirror 22 and illuminates the display panel for green 40G. At this time, the lights illuminating the display panel for green 40G and the display panel for red 40R are respectively set to be substantially parallel light beams.

The second dichroic mirror 22 transmits the blue light B and reflects the green light G. The green light G reflected by the first dichroic mirror 21 is reflected by the second dichroic mirror 22 and thereafter transmitted through the field lens 25 to illuminate the display panel for green 40G.

The first dichroic mirror 21 and the second dichroic mirror 22 are manufactured by forming dielectric multilayer films corresponding to the functions on transparent glass plates.

The relay optical system 30 includes an incident-side lens 31, a first reflection mirror 32, a relay lens 33, a second reflection mirror 34, and an emission-side lens 35 functioning as a field lens. A light beam of the blue light B tends to be larger because the blue light B has a longer optical path compared with the green light G and the red light R. Accordingly, expansion of the light beam is suppressed using the relay lens 33. The blue light B emitted from the color separation optical system 20 is reflected by the first reflection mirror 32 and converged by the incident-side lens 31 near the relay lens 33. The blue light B diverges toward the second reflection mirror 34 and the emission-side lens 35.

The emission-side lens 35 has the same function as the function of the field lenses 24 and 25 explained above and illuminates the display panel for blue 40B. The light illuminating the display panel for blue 40B is set to be a substantially parallel light beam.

The display panel 40 functions as a light modulating device in the projector 1. A liquid crystal panel of a transmission type is adopted as the display panel 40. In this case, an incident-side polarizing plate and an emission-side polarizing plate are usually provided in addition to the liquid crystal panel functioning as the display panel 40. Although not illustrated, the incident-side polarizing plate only has to be fixed on a light incident side of the liquid crystal panel. A polarizing plate 405 shown in FIG. 8 corresponds to the emission-side polarizing plate.

The display panel 40 functioning as the light modulating device is not limited to the liquid crystal panel of the transmission type. A light modulating device of a reflection type such as a reflection-type liquid crystal panel may be adopted as the light modulating device. A digital micromirror device (DMD) or the like that modulates light emitted from the light source 11 by controlling an emitting direction of incident light for each of micromirrors functioning as pixels may be adopted. In the digital micromirror device, a surface on which the micromirrors are arranged in a matrix shape is equivalent to a display surface. Further, the projector 1 is not limited to a configuration including a light modulating device for each of a plurality of color lights and may have a configuration for modulating the plurality of color lights in a time-division manner with one light modulating device. The adjusting mechanism 7 in this embodiment exerts more effects in position adjustment of the plurality of display panels 40.

As explained above, among the plurality of display panels 40, the display panel for blue 40B is mounted on the adjusting mechanism for blue 70 and the display panel for red 40R is mounted on the adjusting mechanism for red 80. The adjusting mechanism 7, that is, the adjusting mechanism for blue 70 and the adjusting mechanism for red 80 are explained below.

The cross dichroic prism 50 combines converted lights of the colors emitted from the plurality of display panels 40. Specifically, the cross dichroic prism 50 combines lights respectively emitted from the display panel for red 40R, the display panel for green 40G, and the display panel for blue 40B. The cross dichroic prism 50 includes a red-light reflecting dichroic surface 51R that reflects the red light R and a blue-light reflecting dichroic surface 51B that reflects the blue light B. A dielectric multilayer film that reflects the red light R is disposed on the red-light reflecting dichroic surface 51R. A dielectric multilayer film that reflects the blue light B is disposed on the blue-light reflecting dichroic surface 51B. The red-light reflecting dichroic surface 51R and the blue-light reflecting dichroic surface 51B are hereinafter simply referred to as reflecting dichroic surfaces 51R and 51B as well.

In plan view of the disposition of the color separation optical system 20, the relay optical system 30, and the cross dichroic prism 50, the dielectric multilayer film that reflects the red light R and the dielectric multilayer film that reflects the blue light B are arranged in a substantially X shape. The converted lights of the three colors of the red light R, the green light G, and the blue light B are combined by the reflecting dichroic surfaces 51R and 51B and combined light for displaying a color image is generated. The combined light generated by the cross dichroic prism 50 in this way is emitted toward the projection lens 60.

The projection lens 60 is attached to the main body section 2. The combined light passed through the projection lens 60 and emitted from the main body section 2 is projected onto a projection target such as a not-shown screen as image light.

1.2. Adjusting Mechanism

Figure 2:
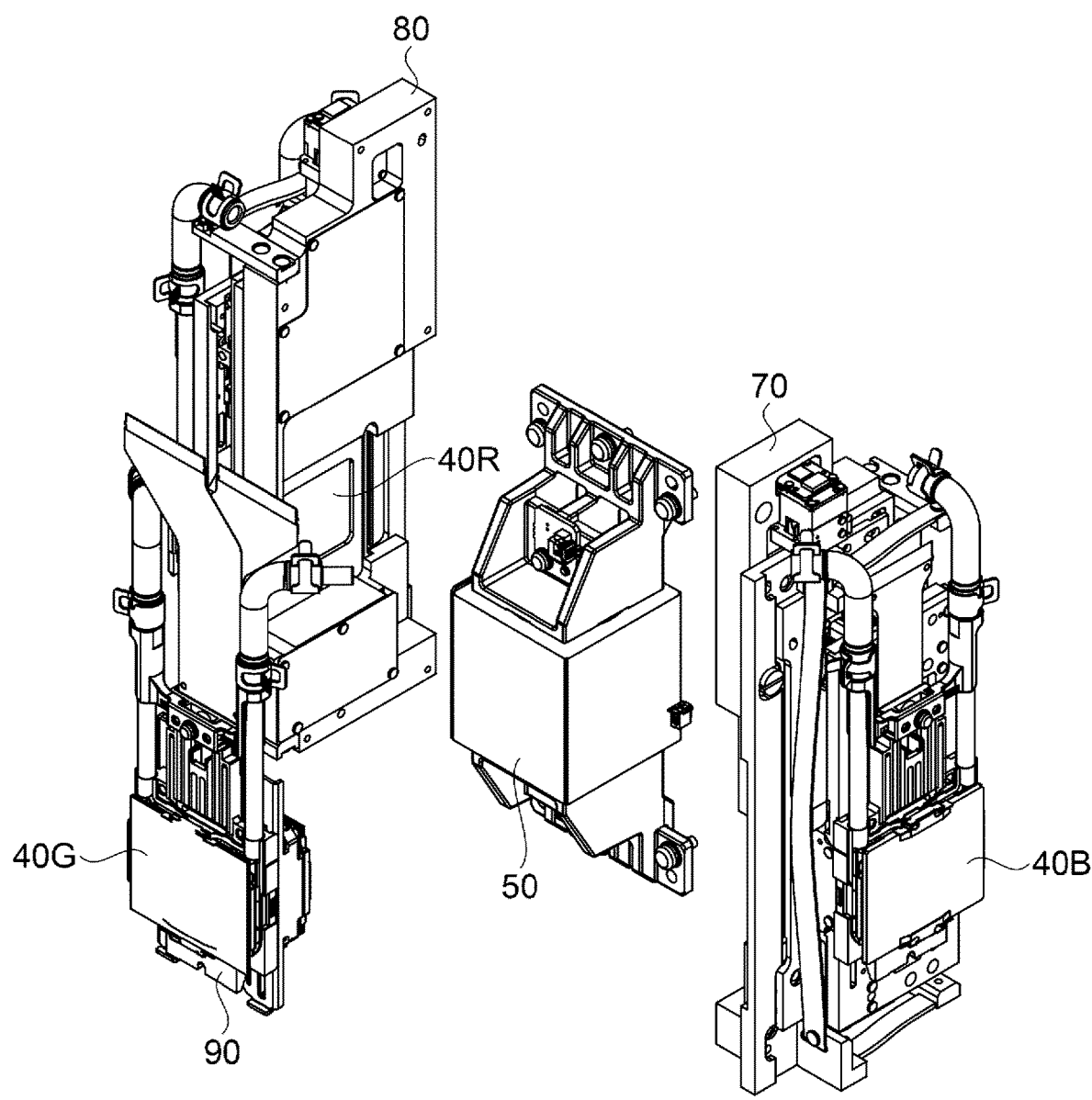
Figure 3:
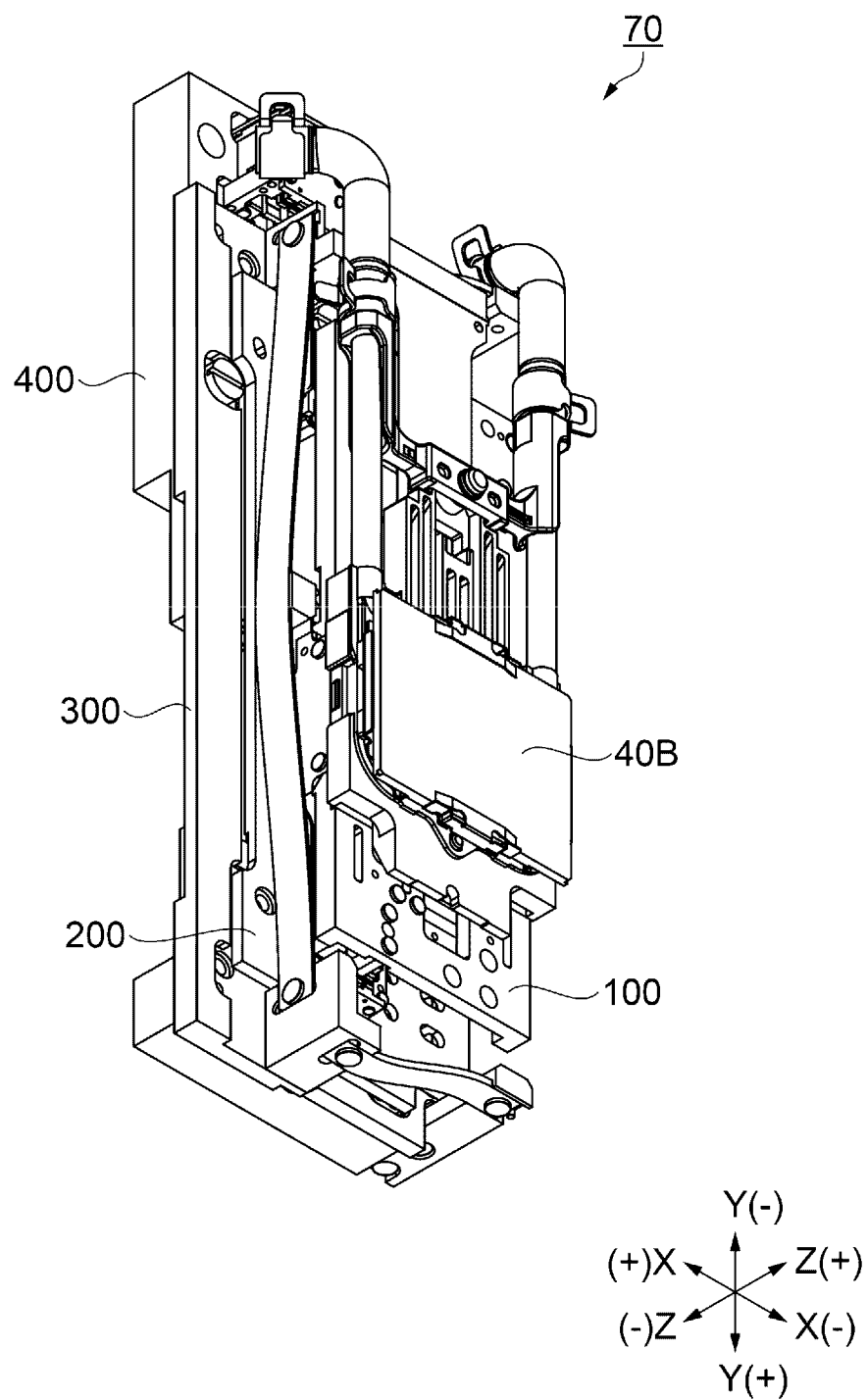
FIG. 3 is a perspective view showing the exterior of an adjusting mechanism.
Figure 4:
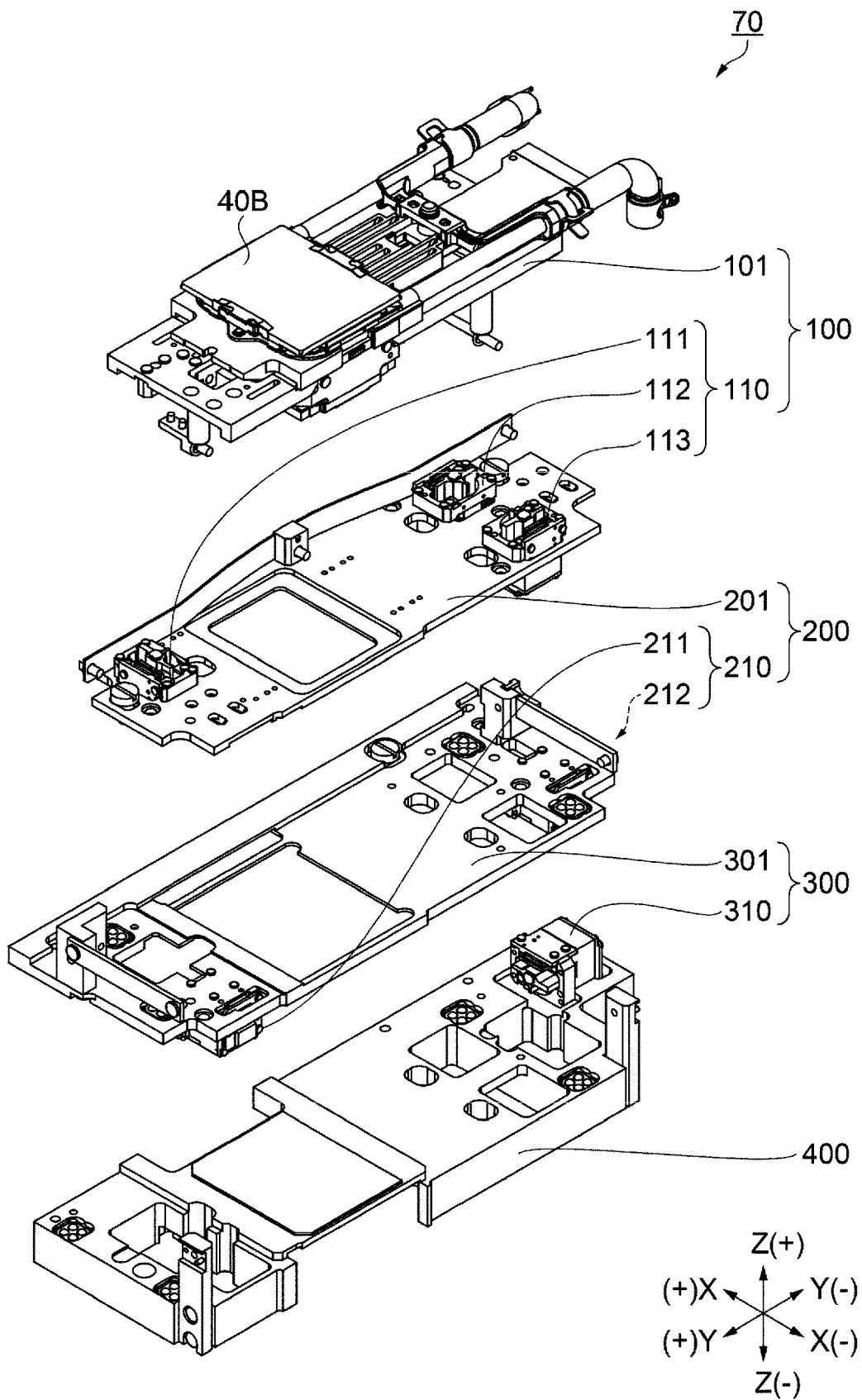
FIG. 4 is an exploded perspective view showing the configuration of the adjusting mechanism.

The configuration of the adjusting mechanism according to this embodiment is explained with reference to FIGS. 2, 3, and 4. FIG. 2 is a perspective view showing disposition of the cross dichroic prism 50, the display panel 40, and the like. FIG. 3 is a perspective view showing the exterior of the adjusting mechanism 7. FIG. 4 is an exploded perspective view showing the configuration of the adjusting mechanism 7. In FIG. 2, to facilitate understanding of the disposition of the components, the distance between the cross dichroic prism 50 and the three display panels 40 is shown larger than an actual distance. In FIG. 2, the disposition of the display panel for blue 40B and the display panel for red 40R is reversed left and right from FIG. 1 with respect to the cross dichroic prism 50. Further, in FIGS. 3 and 4, among the adjusting mechanisms 7, the adjusting mechanism for blue 70 mounted with the display panel for blue 40B is shown.

As shown in FIG. 2, the display panel for green 40G, the display panel for blue 40B, and the display panel for red 40R are disposed in three directions with respect to the cross dichroic prism 50. The display panel for blue 40B is mounted on the adjusting mechanism for blue 70. The display panel for red 40R is mounted on the adjusting mechanism for red 80. The display panel for green 40G is mounted on the mounting member 90. The adjusting mechanism for blue 70 is located between the display panel for blue 40B and the cross dichroic prism 50. The adjusting mechanism for red 80 is located between the display panel for red 40R and the cross dichroic prism 50. The mounting member 90 is located between the display panel for green 40G and the cross dichroic prism 50.

In the adjusting mechanism 7 and the mounting member 90, light blocking members are not interposed between the mounted display panels 40 and the cross dichroic prism 50. Accordingly, lights modulated by the display panels 40 are made incident on the cross dichroic prism 50 without being blocked by the adjusting mechanism 7 and the mounting member 90. This form is seen, in FIG. 2, in the adjusting mechanism for red 80 in which the rear surface of the surface on which the display panel for red 40R is placed is illustrated.

When, among the plurality of display panels 40, the display panel for green 40G is represented as a first display panel and the display panel for blue 40B or the display panel for red 40R is represented as a second display panel, the second display panel is mounted on the adjusting mechanism 7 in this embodiment corresponding thereto. The position of the second display panel with respect to the first display panel is adjusted by the adjusting mechanism 7.

The adjusting mechanism for red 80 mounted with the display panel for red 40R has the same configuration as the configuration of the adjusting mechanism for blue 70. Accordingly, about the adjusting mechanism 7 in this embodiment, in the following explanation, the adjusting mechanism for blue 70 is explained as a representative example. Explanation of the adjusting mechanism for red 80 is omitted.

In this embodiment, the display panel for green 40G is not mounted on the adjusting mechanism according to the present disclosure. However, the display panel for green 40G is not limited to this. The display panel for green 40G may be mounted on the adjusting mechanism according to the present disclosure instead of the mounting member 90. The mounting member 90 mounted with the display panel for green 40G may include a focus adjusting mechanism for adjusting the distance between the display panel for green 40G and the projection lens 60 shown in FIG. 1.

As shown in FIG. 3, the adjusting mechanism for blue 70 includes a first stage 100, a second stage 200, a third stage 300, and a base 400. In a state in which the display panel for blue 40B is placed on a placing portion explained below, when a surface parallel to a display surface of the display panel for blue 40B is set as a reference plane, a coordinate axis orthogonal to the reference plane is represented as a Z axis and coordinate axes orthogonal to each other in the reference plane are represented as an X axis and a Y axis and a rotating direction around the X axis is represented as a θx direction, a rotating direction around the Y axis is represented as a θy direction, and a rotating direction around the Z axis is represented as a θz direction. Further, + or − signs shown in the figures are added to respective directions along the X axis, the Y axis, and the Z axis, the respective + directions are represented as positive directions and the respective − directions are represented as negative directions. In the following explanation, the respective directions along the X axis, the Y axis, and the Z axis are simply referred to as X direction, Y direction, and Z direction as well.

The adjusting mechanism for blue 70 has an elongated rectangular shape along the Y axis in plan view from the positive Z direction. The base 400 side, in other words, the negative Z-direction side of the adjusting mechanism for blue 70 is fixed to the cross dichroic prism 50 shown in FIG. 2.

The display panel for blue 40B is mounted closer to the positive Y direction from the center in the Y direction, which is the longitudinal direction in the adjusting mechanism for blue 70, in the plan view. The display panel for blue 40B is rectangular. Among four sides forming the rectangle, two sides are disposed along the Y axis and the other two sides are disposed along the X axis.

As shown in FIG. 4, the adjusting mechanism for blue 70 includes the first stage 100 including a placing portion explained below on which the display panel for blue 40B is placed, the second stage 200 that supports the first stage 100, the third stage 300 that supports the second stage 200, and the base 400 that supports the third stage 300. The first stage 100, the second stage 200, the third stage 300, and the base 400 are superimposed in the negative Z direction in this order. Therefore, among the first stage 100, the second stage 200, and the third stage 300, the third stage 300 is located on the nearest side to the cross dichroic prism 50 explained above and the first stage 100 is located on the farthest side from the cross dichroic prism 50.

The first stage 100 includes a first plate 101 on which the display panel for blue 40B is placed and a first actuator 110. The first actuator 110 includes three actuators 111, 112, and 113. The first actuator 110 comes into contact with the first plate 101 and moves the first plate 101 in the positive and negative Z directions, the θx direction, and the θy direction. The first actuator 110 is equivalent to a first position adjusting actuator.

The second stage 200 includes a substantially flat second plate 201 on which the first plate 101 is placed and a second actuator 210. The second actuator 210 includes actuators 211 and 212. The second actuator 210 moves the second plate 201 in the positive and negative X directions and the θz direction. In this specification, it is assumed that changes in postures such as rotations in the θx direction, the θy direction, and the θz direction are also included in the movement. The second actuator 210 is equivalent to a second position adjusting actuator.

The third stage 300 includes a substantially flat third plate 301 on which the second plate 201 is placed and a third actuator 310. The third actuator 310 moves the third plate 301 in the positive and negative Y directions. The third actuator 310 is equivalent to a third position adjusting actuator.

The third plate 301 is placed on the base 400. The negative Z-direction side of the base 400 is fixed to the cross dichroic prism 50 shown in FIG. 2.

The actuators 111, 112, and 113 functioning as the first actuator 110 are mounted on the second plate 201 and are in contact with the first plate 101. The actuators 211 and 212 functioning as the second actuator 210 are mounted on the surface on the negative Z-direction side of the third plate 301. The third actuator 310 is mounted on the base 400. Details of the first actuator 110, the second actuator 210, and the third actuator 310 are explained below.

Figure 5:
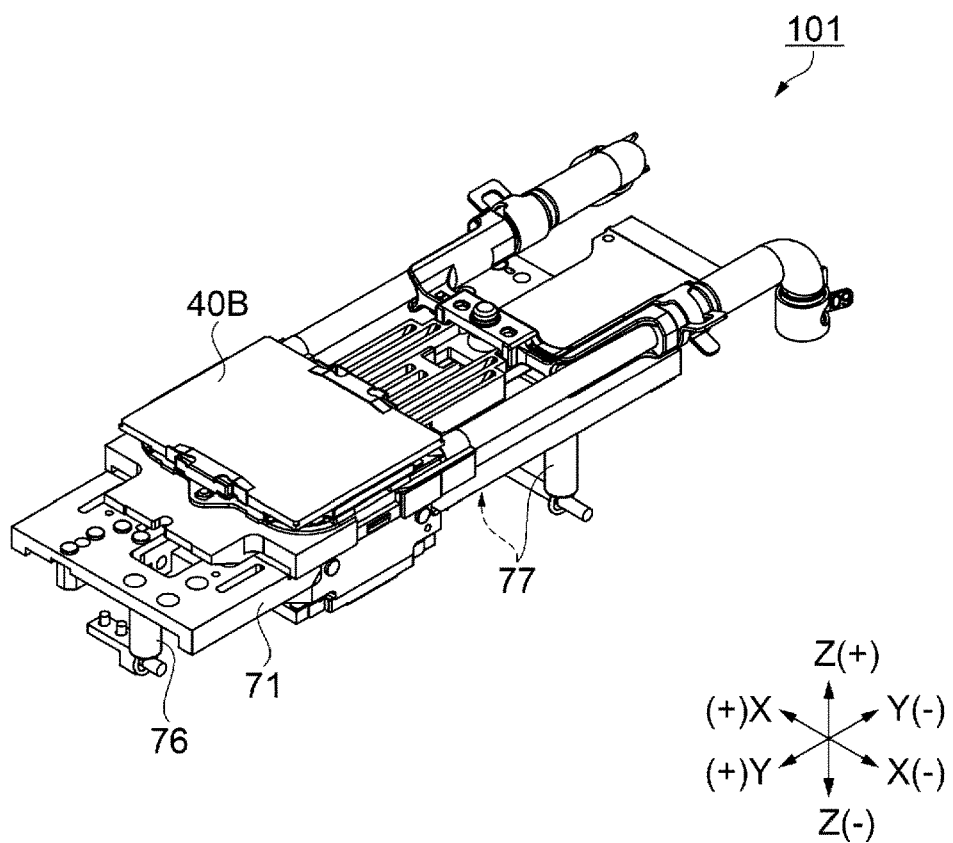
FIG. 5 is a perspective view showing the configuration of a first plate.
Figure 6:
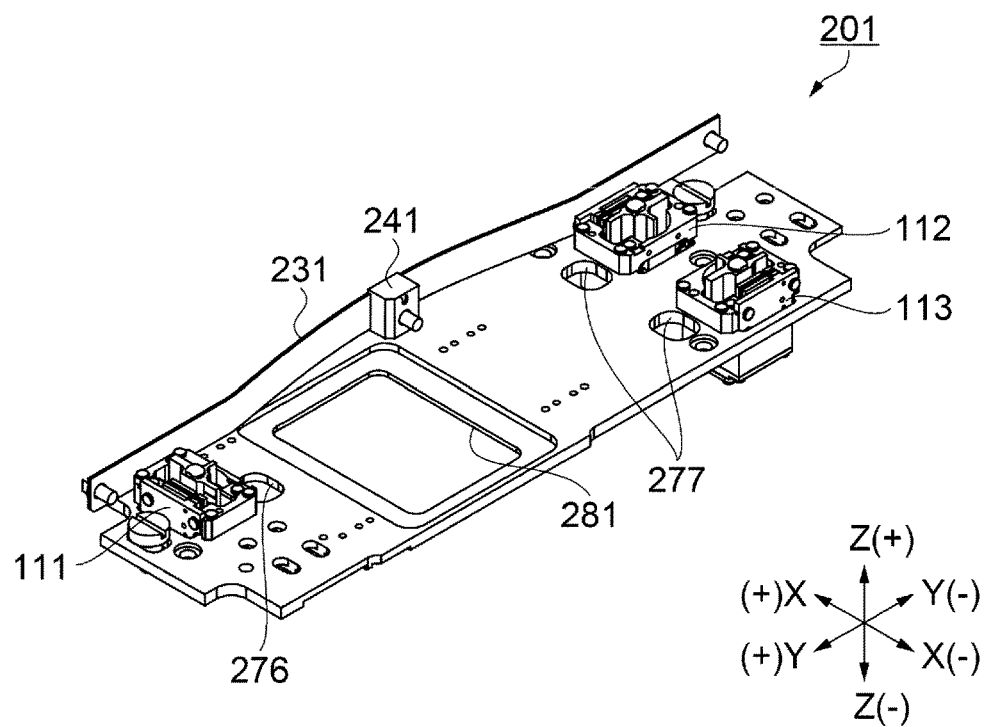
FIG. 6 is a perspective view showing the configuration of a second plate.
Figure 7:
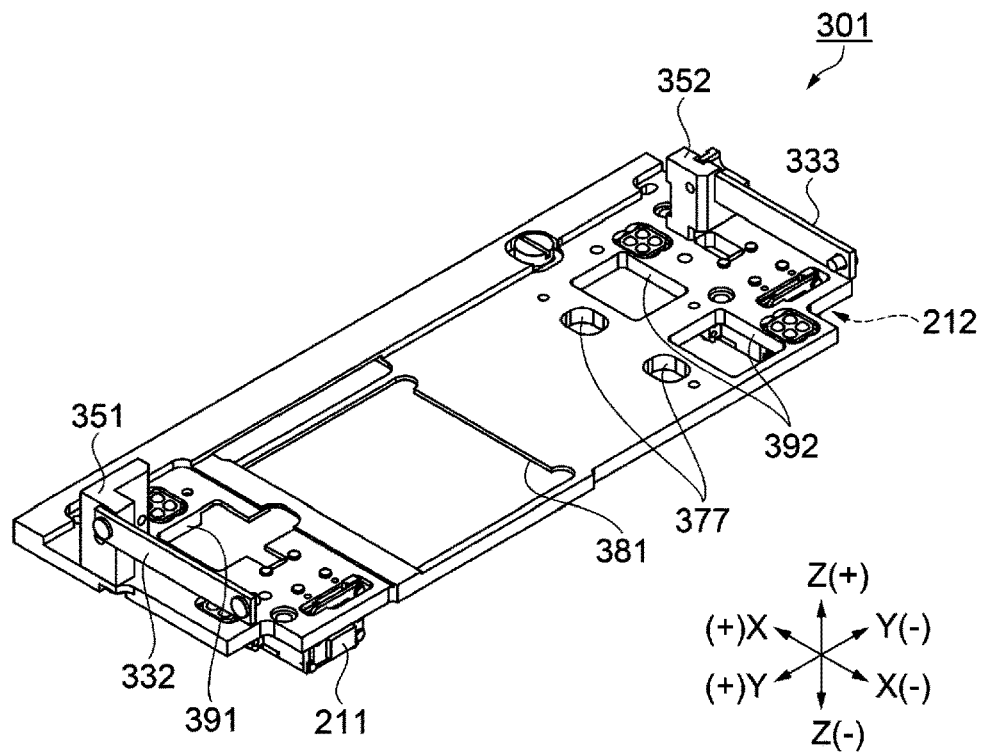
FIG. 7 is a perspective view showing the configuration of a third plate.
Figure 8:
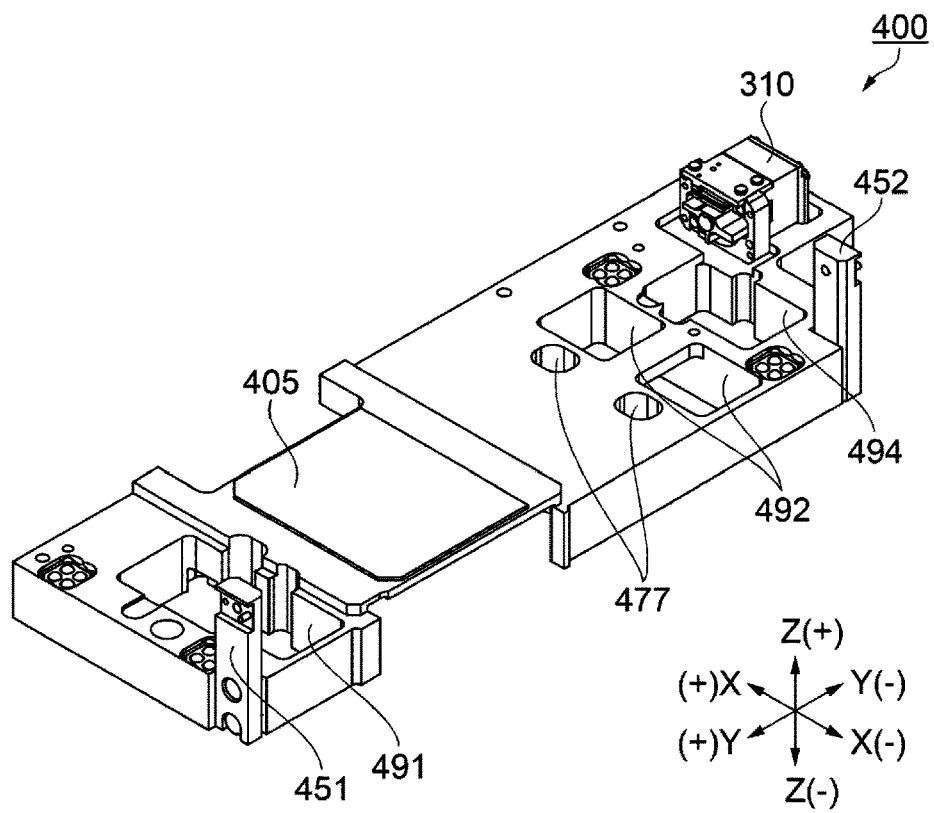
FIG. 8 is a perspective view showing the configuration of a base.

Detailed configurations of the first stage 100, the second stage 200, the third stage 300, and the base 400 are explained with reference to FIGS. 5, 6, 7, and 8. FIG. 5 is a perspective view showing the configuration of the first plate 101. FIG. 6 is a perspective view showing the configuration of the second plate 201. FIG. 7 is a perspective view showing the configuration of the third plate 301. FIG. 8 is a perspective view showing the configuration of the base 400.

For convenience of illustration, FIG. 6 shows a state in which the actuators 111, 112, and 113 are mounted on the second plate 201. FIG. 7 shows a state in which the actuators 211 and 212 are mounted on the third plate 301. FIG. 8 shows a state in which the third actuator 310 is mounted on the base 400.

As shown in FIG. 5, the first plate 101 is substantially oblong. The long side of the first plate 101 is disposed along the Y axis and the short side of the first plate 101 is disposed along the X axis. The first plate 101 includes a placing portion 71, a spring member 76, and a pair of spring members 77. The display panel for blue 40B is placed on the placing portion 71.

The spring member 76 and the pair of spring members 77 are coil springs made of metal. One end of the spring member 76 is fixed to the negative Z-direction side at a positive Y-direction end portion of the first plate 101. The pair of spring members 77 is disposed side by side along the positive and negative X directions. The pair of spring members 77 is present in the negative Y-direction side across the placing portion 71 with respect to the spring member 76. One ends of the pair of spring members 77 are fixed to the negative Z-direction side in the first plate 101.

The other ends of the spring member 76 and the pair of spring members 77 are respectively fixed to the surface on the negative Z-direction side in the base 400 via opening sections explained below of the second plate 201, the third plate 301, and the base 400. Accordingly, the first plate 101 and the base 400 are coupled by the spring member 76 and the pair of spring members 77. The second plate 201 and the third plate 301 are held between the first plate 101 and the base 400. At this time, tensile loads of the spring member 76 and the pair of spring members 77 are set such that the first plate 101, the second plate 201, and the third plate 301 are movable with respect to the base 400.

As shown in FIG. 6, the second plate 201 is substantially oblong. The long side of the second plate 201 is disposed along the Y axis and the short side of the second plate 201 is disposed along the X axis. The second plate 201 includes a first elastic member 231, a coupling section 241, opening sections 276 and 281, and a pair of opening sections 277. The first elastic member 231 couples the second plate 201 and the third plate 301. The actuators 111, 112, and 113 functioning as the first actuator 110 are disposed to pierce through the second plate 201 in the positive and negative Z directions.

The first elastic member 231 is a single-plate leaf spring, the longitudinal direction of which extends along the Y axis. The width direction of the first elastic member 231 is arranged along the Z axis and the thickness direction of the first elastic member 231 is arranged along the X axis. The length in the longitudinal direction of the first elastic member 231 is shorter than the long side and is longer than the short side of the second plate 201. With the disposition explained above, the first elastic member 231 is elastically deformable in the positive and negative X directions. The substantial center in the longitudinal direction of the first elastic member 231 is coupled and fixed to the second plate 201 via the coupling section 241. Both the end portions in the longitudinal direction of the first elastic member 231 are coupled to the third plate 301 via a contact portion explained below of the third plate 301. Consequently, the first elastic member 231 couples the second plate 201 and the third plate 301.

At this time, the first elastic member 231 is disposed near the long side on the positive X-direction side of the second plate 201. The first plate 101 is laid on the second plate 201 avoiding the first elastic member 231. In this way, the first elastic member 231 is disposed in a minimum setting space.

In this embodiment, the single-plate leaf spring, a so-called thin leaf spring is used as the first elastic member 231. However, the first elastic member 231 is not limited to this. Other elastic members such as other leaf springs such as a laminated leaf spring, springs such as a coil spring and a disc spring, and a rubber material may be used as the first elastic member 231 if the first elastic member 231 couples the second plate 201 and the third plate 301 and is elastically deformable with respect to the positive and negative X directions. Among these elastic members, it is desirable to use the leaf spring from the viewpoint that a space required for setting is relatively small.

The opening section 281 is a substantially rectangular window piercing through the second plate 201. The opening section 281 is provided in a position overlapping, in the plan view from the positive Z direction, the display panel for blue 40B placed on the placing portion 71 of the first plate 101. Accordingly, light modulated by the display panel for blue 40B is emitted without being blocked by the second plate 201.

In the first actuator 110, the actuator 111 functioning as the first actuator is disposed on the positive Y-direction side, which is one side, with respect to the opening section 281, in other words, the placing portion 71 in the plan view from the positive Z direction. In the first actuator 110, the actuator 112 functioning as the second actuator and the actuator 113 functioning as the third actuator are disposed on the negative Y-direction side, which is the other side, with respect to the placing portion 71 in the plan view from the positive Z direction. In other words, the actuators 112 and 113 are located on the opposite side of the actuator 111 with respect to the placing portion 71. The actuators 112 and 113 are disposed side by side along the positive and negative X directions. That is, the actuator 111 and the actuators 112 and 113 are disposed to be opposed in the positive and negative Y directions across the placing portion 71 in the plan view from the positive Z direction.

The opening section 276 and the pair of opening sections 277 are openings piercing through the second plate 201 and are formed larger than a coil outer shape of the spring member 76 and the pair of spring members 77. The opening section 276 is provided in a position corresponding to the spring member 76 in the plan view from the positive Z direction. The pair of opening sections 277 is provided in positions corresponding to the pair of spring members 77. Consequently, when the adjusting mechanism for blue 70 is assembled, the spring member 76 and the pair of spring members 77 are disposed through the opening section 276 and the pair of opening sections 277.

As shown in FIG. 7, the third plate 301 is substantially oblong. The long side of the third plate 301 is disposed along the Y axis and the short side of the third plate 301 is disposed along the X axis. The third plate 301 includes a second elastic member 332 and a third elastic member 333, a pair of contact portions 351 and 352, opening sections 381 and 391, and a pair of opening sections 377 and 392. The actuators 211 and 212 functioning as the second actuator 210 are disposed on the negative Z-direction side of the third plate 301.

The contact portions 351 and 352 are rib-like protrusions projecting in the positive Z direction from the substantially flat third plate 301. The contact portions 351 and 352 are provided at both the end portions in the longitudinal direction, which is the positive and negative Y directions, of the third plate 301. Specifically, the contact portion 351 is provided on the positive Y-direction side and the contact portion 352 is provided on the negative Y-direction side.

The contact portions 351 and 352 are paired. Both the end portions of the first elastic member 231 are respectively coupled to the contact portions 351 and 352. Consequently, the first elastic member 231 is coupled to the third plate 301 via the pair of contact portions 351 and 352. The first elastic member 231 is coupled to the second plate 201 via the coupling section 241 present in a position sandwiched by the pair of contact portions 351 and 352 in the positive and negative Y directions.

The second elastic member 332 and the third elastic member 333 are single-plate leaf springs, the longitudinal direction of which extends along the X axis. The width direction of the second elastic member 332 and the third elastic member 333 is disposed along the Z axis and the thickness direction of the second elastic member 332 and the third elastic member 333 is disposed along the Y axis. The second elastic member 332 and the third elastic member 333 have substantially the same shape. The length in the longitudinal direction of the second elastic member 332 and the third elastic member 333 is shorter than the short side of the third plate 301. With the disposition explained above, the second elastic member 332 and the third elastic member 333 are elastically deformed with respect to the positive and negative Y directions.

The second elastic member 332 is disposed near the short side in the positive Y-direction side in the third plate 301. One end of the second elastic member 332 is coupled to the contact portion 351 and the other end of the second elastic member 332 is coupled to coupling sections explained below of the base 400. The third elastic member 333 is disposed near the short side on the negative Y-direction side in the third plate 301. One end of the third elastic member 333 is coupled to the contact portion 352 and the other end of the third elastic member 333 is coupled to the coupling sections explained below of the base 400. The second elastic member 332 and the third elastic member 333 are provided substantially in parallel to be opposed in the positive and negative Y directions. The second elastic member 332 and the third elastic member 333 couple the third plate 301 and the base 400 and restrict movement of the third plate 301 with respect to the base 400 in the positive and negative Y directions.

When the adjusting mechanism for blue 70 is assembled, the second plate 201 is laid on the third plate 301 avoiding the second elastic member 332 and the third elastic member 333. Accordingly, the second elastic member 332 and the third elastic member 333 are disposed in a minimum setting space.

In this embodiment, the single-plate leaf spring, a so-called thin leaf spring is used as the second elastic member 332 and the third elastic member 333. However, the second elastic member 332 and the third elastic member 333 are not limited to this. The same elastic member as the first elastic member 231 explained above may be used as the second elastic member 332 and the third elastic member 333. It is desirable to use the leaf spring from the viewpoint that a space required for setting is relatively small.

The opening section 381 is a substantially rectangular window piercing through the third plate 301. The opening section 381 is provided in a position overlapping, in the plan view from the positive Z direction, the display panel for blue 40B placed on the placing portion 71 of the first plate 101. Accordingly, light modulated by the display panel for blue 40B is emitted without being blocked by the third plate 301.

The opening section 391 and the pairs of opening sections 377 and 392 are openings piercing through the third plate 301. The opening section 391 is provided in a position corresponding to the actuator 111 and the spring member 76 in the plan view from the positive Z direction. The opening section 391 is formed larger than a shape obtained by combining the shape of a cross section parallel to an XY plane in the actuator 111 and the coil outer shape of the spring member 76. Accordingly, when the adjusting mechanism for blue 70 is assembled, the opening section 391 functions as a clearance for the actuator 111 and is capable of allowing the spring member 76 to pass.

The pair of opening sections 377 is provided in positions corresponding to the pair of spring members 77 in the plan view from the positive Z direction. The pair of opening sections 377 is formed larger than the coil outer shape of the pair of spring members 77. Accordingly, when the adjusting mechanism for blue 70 is assembled, the pair of opening sections 377 is capable of respectively allowing the spring members 77 to pass.

The pair of opening sections 392 is provided in positions corresponding to the actuators 112 and 113 in the plan view from the positive Z direction. The pair of opening sections 392 is respectively formed larger than the shapes of cross sections parallel to the XY plane in the actuators 112 and 113. Accordingly, when the adjusting mechanism for blue 70 is assembled, the pair of opening sections 392 functions as clearances for the actuators 112 and 113.

The actuators 211 and 212 are provided on the negative Z-direction side of the third plate 301 and are paired. The pair of actuators 211 and 212 is disposed to be opposed to the pair of contact portions 351 and 352 and the first elastic member 231 in the positive and negative X directions in the plan view from the positive Z direction.

As shown in FIG. 8, the base 400 is substantially oblong. The long side of the base 400 is disposed along the Y axis. The base 400 includes coupling sections 451 and 452, the polarizing plate 405, opening sections 491 and 494, and pairs of opening sections 477 and 492. The third actuator 310 is disposed to pierce through the base 400 in the positive and negative Z directions.

The coupling sections 451 and 452 are columnar protrusions projecting in the positive Z direction from the substantially flat base 400 and are paired. The coupling sections 451 and 452 are present on the long side on the negative X-direction side in the base 400 and provided at both the end portions of the long side. Specifically, the coupling section 451 is provided on the positive Y-direction side and the coupling section 452 is provided on the negative Y-direction side. An end portion of the second elastic member 332 is coupled to the coupling section 451. An end portion of the third elastic member 333 is coupled to the coupling section 452.

The polarizing plate 405 is provided in a position overlapping the display panel for blue 40B in the plan view from the positive Z direction. The polarizing plate 405 is an emission-side polarizing element of the display panel for blue 40B. Light modulated by the display panel for blue 40B is emitted via the polarizing plate 405.

The opening sections 491 and 494 and the pairs of opening sections 477 and 492 are openings piercing through the base 400. The opening section 491 is provided in a position corresponding to the actuators 111 and 211 and the spring member 76 in the plan view from the positive Z direction. The opening section 491 is formed larger than a shape obtained by combining the shape of cross sections parallel to the XY plane in the actuators 111 and 211 and the coil outer shape of the spring member 76. Accordingly, when the adjusting mechanism for blue is assembled, the opening section 491 functions as a clearance for the actuators 111 and 211 and is capable of allowing the spring member 76 to pass.

The pair of opening sections 477 is provided in positions corresponding to the pair of spring members 77 in the plan view from the positive Z direction. The pair of opening sections 477 is formed larger than the coil outer shape of the pair of the spring members 77. Accordingly, when the adjusting mechanism for blue 70 is assembled, the pair of opening sections 477 is respectively capable of allowing the spring members 77 to pass.

The pair of opening sections 492 is provided in positions corresponding to the actuators 112 and 113 in the plan view from the positive Z direction. The pair of opening sections 492 is respectively formed larger than the shape of cross sections parallel to the XY plane in the actuators 112 and 113. Accordingly, when the adjusting mechanism for blue 70 is assembled, the pair of opening sections 492 respectively functions as clearances for the actuators 112 and 113.

The opening section 494 is provided in a position corresponding to the actuator 212 in the plan view from the positive Z direction. The opening section 494 is formed larger than the shape of a cross section parallel to the XY plane in the actuator 212. Accordingly, when the adjusting mechanism for blue 70 is assembled, the opening section 494 functions as the actuator 212.

Figure 9:
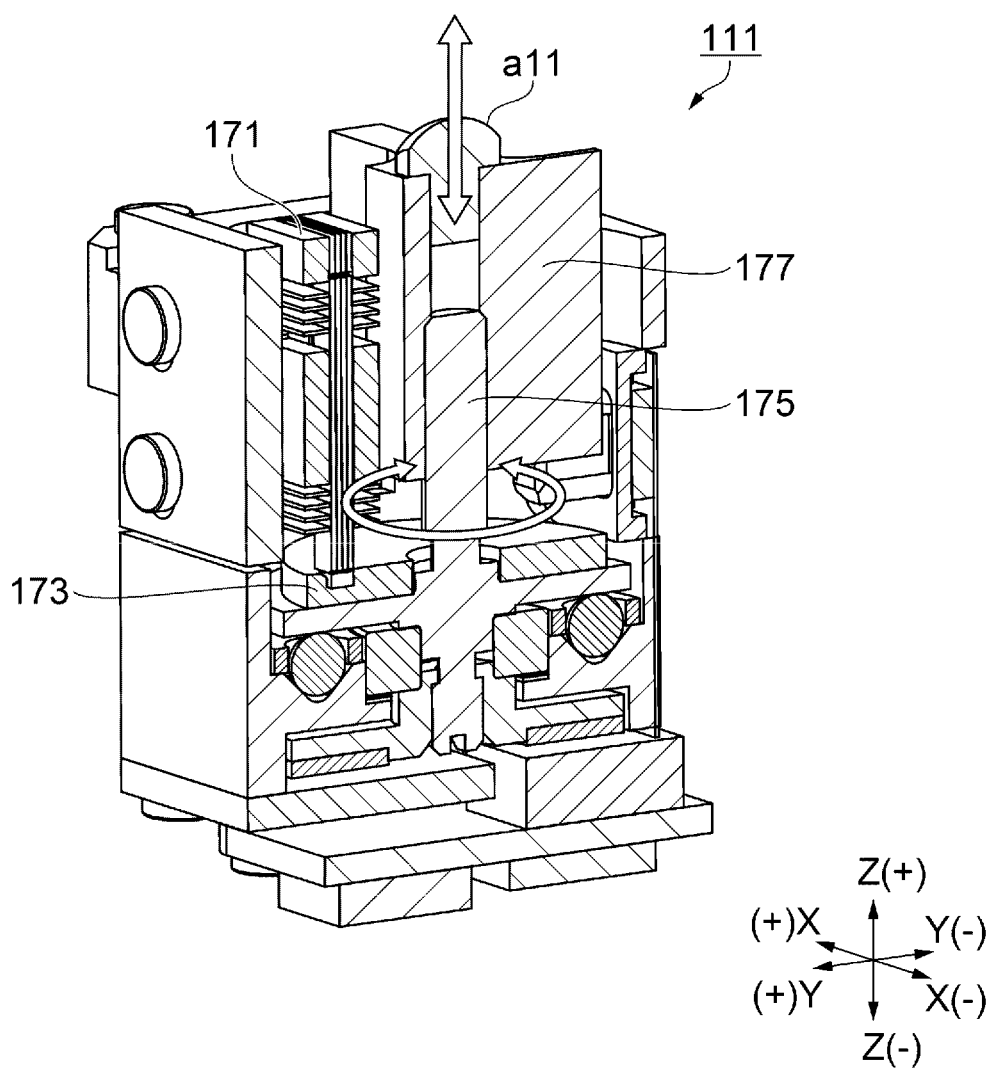
FIG. 9 is a schematic sectional view showing the configuration of an actuator.

The configuration of the first actuator 110, the second actuator 210, and the third actuator 310 is explained with reference to FIG. 9. FIG. 9 is a schematic sectional view showing the configuration of the actuator 111. The first actuator 110, the second actuator 210, and the third actuator 310 have the same configuration, although parts and directions in which the first actuator 110, the second actuator 210, and the third actuator 310 are disposed in the adjusting mechanism for blue 70 are different. Accordingly, in FIG. 9, the actuator 111 in the first actuator 110 is shown as a representative example. In FIG. 9, a cross section parallel to a YZ plane and passing the center of a linearly mover explained below in the actuator 111 is shown.

As shown in FIG. 9, the actuator 111 includes a driving section 171, a disk member 173, a lead screw 175, a nut section 177, and a first linearly mover a11. The actuator 111 is a substantially rectangular parallelepiped and is a driving source for moving the position of the display panel for blue 40B.

The nut section 177 is disposed substantially in the center of the actuator 111 in the plan view from the positive Z direction. A part of the nut section 177 projects from the surface on the positive Z-direction side of the actuator 111. On the other hand, the negative Z-direction side of the nut section 177 is sunk into the inside of the actuator 111. A columnar through-hole drilled in the positive and negative Z directions is provided in the nut section 177. A female screw is provided on the inner surface on the negative Z-direction side in the through-hole.

The first linearly mover a11 is fit in the positive Z-direction side of the through-hole in the nut section 177. The positive Z-direction side of the first linearly mover a11 projects from the nut section 177. That is, the distal end on the positive Z-direction side of the first linearly mover a11 projects to the positive Z-direction side of the actuator 111. A portion of the distal end projecting from the nut section 177 in the first linearly mover a11 is larger than a portion of the first linearly mover a11 fit in the through-hole. Accordingly, the first linearly mover a11 does not further sink in the negative Z direction with respect to the nut section 177 from a state illustrated in FIG. 9. The distal end of the first linearly mover a11 is formed as a curved surface and is in contact with the surface on the negative Z-direction side in the first plate 101 shown in FIG. 4.

The lead screw 175 is disposed on the negative Z-direction side of the first linearly mover a11. The lead screw 175 has a shape rotationally symmetrical with respect to a straight line parallel to the Z axis and includes a shaft disposed along the Z axis. In the shaft, a brim section is provided substantially in the center in the positive and negative Z directions. A male screw is provided on the positive Z-direction side from the brim section. Consequently, the male screw of the lead screw 175 and the female screw of the nut section 177 are screwed. A part of the shaft of the lead screw 175 is fit in the nut section 177.

The disk member 173 is fit and fixed in the positive Z-direction side of the brim section of the lead screw 175. The disk member 173 is a disk having a circular opening in the center in the plan view from the positive Z direction. The shaft of the lead screw 175 pierces through the opening. The disk member 173 is disposed along the XY plane. The center axis in the through-hole of the nut section 177 and a rotationally symmetrical axis of the lead screw 175 and the disk member 173 coincide. Accordingly, when the disk member 173 rotates around the axis, the lead screw 175 also rotates. The male screw of the lead screw 175 is screwed with the female screw of the nut section 177. Rotation of the nut section 177 synchronizing with the rotation of the lead screw 175 is restricted. Therefore, the nut section 177 moves in the positive and negative Z directions according to the rotation of the lead screw 175.

In the plan view from the positive Z direction, the driving section 171 is in contact with the vicinity of the outer circumference in the disk member 173. The driving section 171 is a piezoelectric element. A voltage is applied to the driving section 171, whereby an inverse piezoelectric effect is exerted. With the inverse piezoelectric effect, the disk member 173 receives a rotating force in the circumferential direction from the driving section 171. When the voltage is applied, the driving section 171 is capable of rotating the disk member 173. When the applied voltage is set to reverse potential, the driving section 171 is also capable of reversely rotating the disk member 173. A signal wire and a power supply wire are coupled to the driving section 171. The signal wire is coupled to a not-shown control section of the projector 1. The control section is, for example, a CPU (Central Processing Unit). The power supply wire is coupled to a not-shown power supply section of the projector 1.

With the configuration explained above, in the plan view from the positive Z direction, when the driving section 171 rotates the disk member 173 clockwise, the lead screw 175 also rotates in the same direction. Accordingly, the nut section 177 moves in the positive Z direction while the through-hole screws with the shaft of the lead screw 175. Consequently, the nut section 177 projects together with the first linearly mover a11. That is, the operation of the driving section 171 is controlled, whereby a projection amount, in other words, a movement amount of the distal end of the first linearly mover a11 in the positive Z direction changes.

On the other hand, in the plan view from the positive Z direction, when the driving section 171 rotates the disk member 173 counterclockwise, the lead screw 175 rotates in the same direction. Accordingly, the nut section 177 moves in the negative Z direction while the through-hole screws with the shaft of the lead screw 175. Consequently, the nut section 177 moves to sink into the actuator 111 together with the first linearly mover a11. That is, the operation of the driving section 171 is controlled, whereby the projection amount of the distal end of the first linearly mover a11 in the negative Z direction changes. Consequently, the first linearly mover a11 of the actuator 111 is capable of linearly moving in the positive and negative Z directions.

In the first actuator 110, the second actuator 210, and the third actuator 310 other than the actuator 111, the action explained above is the same and explanation of the action is omitted.

In this embodiment, the actuator 111 including the piezoelectric element as the driving source is illustrated. However, the actuator 111 is not limited to this. As the first actuator 110, the second actuator 210, and the third actuator 310, a combination of an electromagnetic motor and a ball screw, a voice coil motor, a solenoid actuator, and the like may be adopted.

As explained above, the adjusting mechanism for blue 70 has the configuration explained above. As explained above, the adjusting mechanism for red 80 mounted with the display panel for red 40R has the same configuration as the configuration of the adjusting mechanism for blue 70. Therefore, explanation of the adjusting mechanism for red 80 is omitted.

1.3. Adjusting Method

A position adjusting method for the display panel 40 in the adjusting mechanism 7 is explained using the adjusting mechanism for blue 70 and the display panel for blue 40B as an example. A position adjusting method for the display panel for red 40R in the adjusting mechanism for red 80 is the same as a position adjusting method for the display panel for blue 40B in the adjusting mechanism for blue 70. Therefore, explanation of the position adjusting method for the display panel for red 40R is omitted.

1.3.1. Adjusting Method for Three Axes of θx, θy, and Z

Figure 10A:
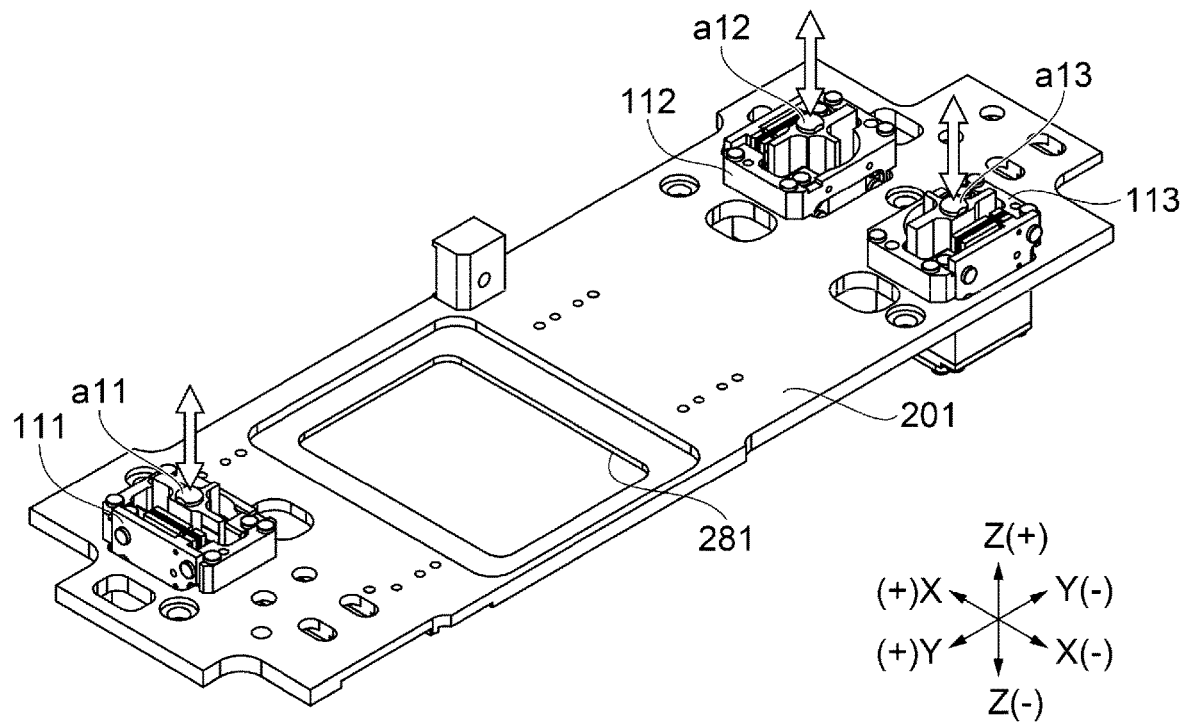
FIG. 10A is a schematic diagram showing a Z one-axis adjusting method.
Figure 10B:
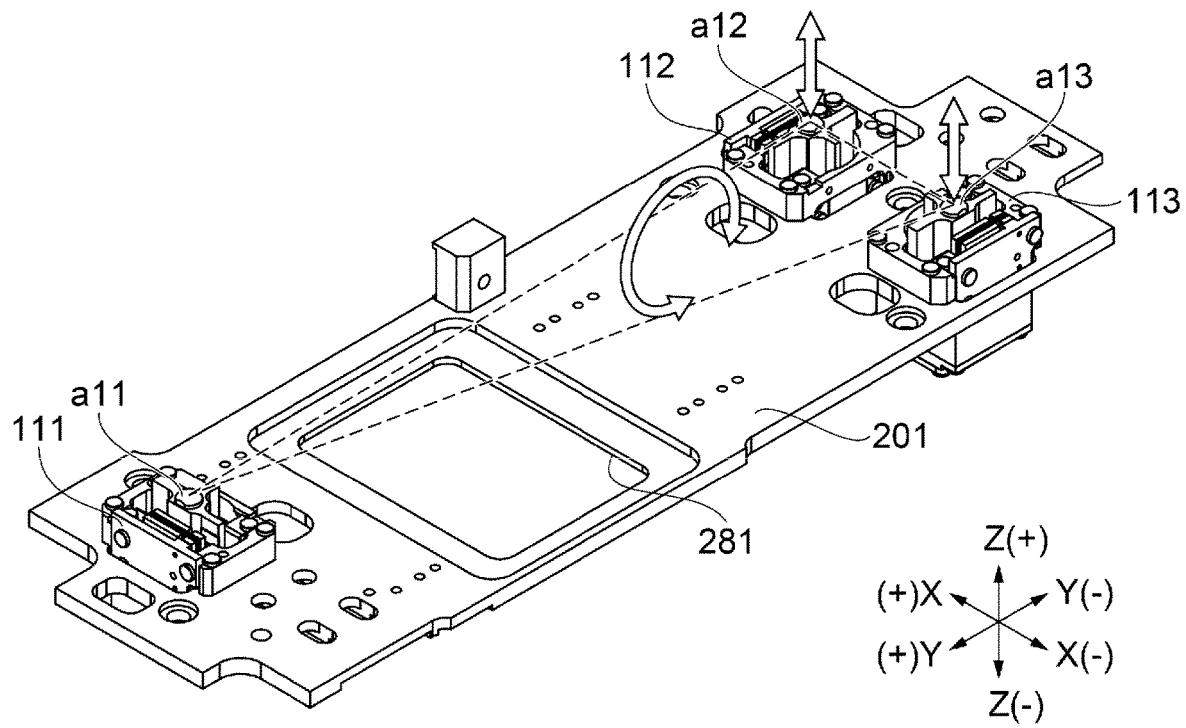
FIG. 10B is a schematic diagram showing a θx one-axis adjusting method.
Figure 10C:
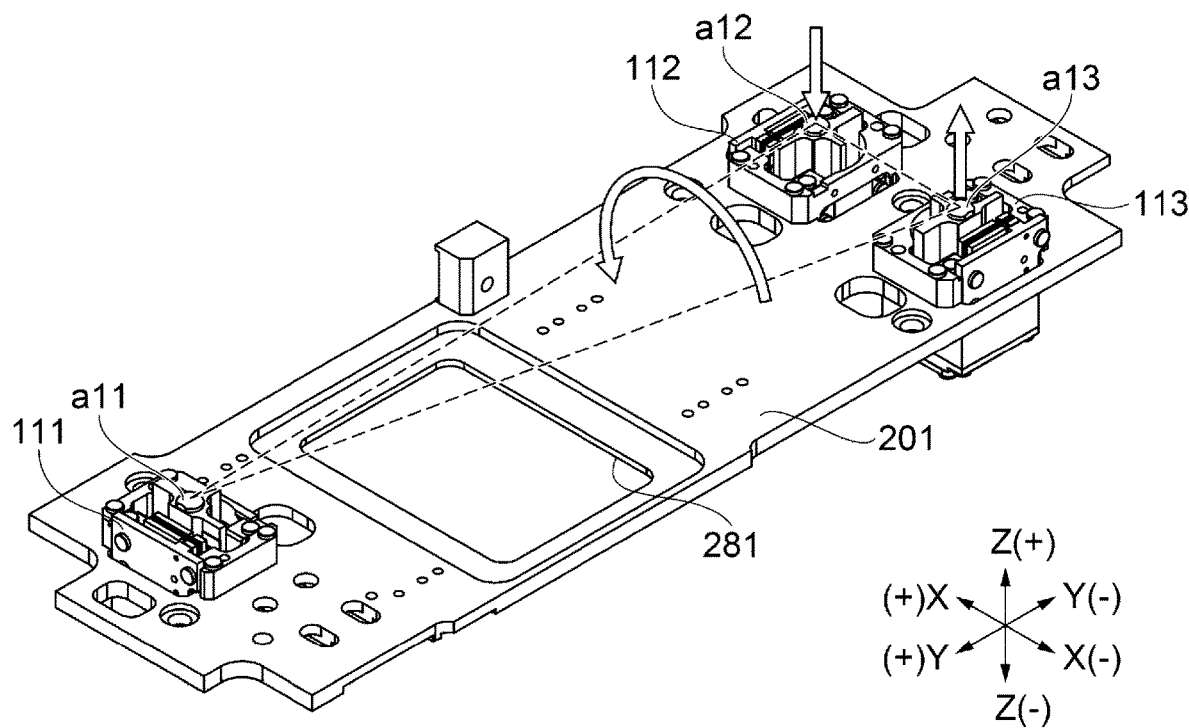
FIG. 10C is a schematic diagram showing a θy one-axis adjusting method.

An adjusting method for three axes of θx, θy, and Z in the first stage 100 is explained with reference to FIGS. 10A, 10B, and 10C. FIG. 10A is a schematic diagram showing a Z one-axis adjusting method. FIG. 10B is a schematic diagram showing a θx one-axis adjusting method. FIG. 10C is a schematic diagram showing a θy one-axis adjusting method. In FIGS. 10A, 10B, and 10C, only the second plate 201 and the first actuator 110 mounted on the second plate 201 are illustrated. Illustration of the other components is omitted.

As shown in FIG. 10A, the three actuators 111, 112, and 113 functioning as the first actuator 110 are disposed at vertexes of a triangle across the opening section 281 in the plan view from the positive Z direction. The actuator 111 functioning as the first actuator 110 includes the first linearly mover a11 that linearly moves in the direction along the Z axis. The actuator 112 functioning as the first actuator 110 includes a second linearly mover a12 that linearly moves in the direction along the Z axis. The actuator 113 functioning as the first actuator 110 includes a third linearly mover a13 that linearly moves in the direction along the Z axis. In the following explanation, the first linearly mover a11, the second linearly mover a12, and the third linearly mover a13 are sometimes collectively simply referred to as linearly mover "a".

In the actuators 111, 112, and 113, the distal ends of three linearly movers "a" are disposed to face the positive Z direction. The distal ends of the three linearly movers "a" come into contact with, from the negative Z direction, which is a first direction, in the direction along the Z axis, the not-shown first plate 101 located on the positive Z-direction side of the second plate 201. The linearly movers "a" of the three actuators 111, 112, and 113 linearly move in the positive and negative Z directions as explained above.

When the respective linearly movers "a" of the three actuators 111, 112, and 113 are linearly moved by an equal projection amount in the positive and negative Z directions, the first plate 101, with which the linearly movers "a" are in contact, moves in the positive and negative Z directions with respect to the second plate 201. Consequently, it is possible to perform position adjustment for Z one axis.

The three actuators 111, 112, and 113 are individually operable. Accordingly, it is also possible to individually change a projection amount in the positive and negative Z directions in the three linearly movers "a".

As shown in FIG. 10B, the second linearly mover a12 of the actuator 112 functioning as the second actuator and the third linearly mover a13 of the actuator 113 functioning as the third actuator are moved by an equal projection amount in the positive and negative Z directions relatively to the first linearly mover a11 of the actuator 111 functioning as the first actuator. Consequently, the first plate 101 moves in the $\theta x$ direction with respect to the second plate 201.

"Relatively to the first linearly mover a11 of the actuator 111" indicates any one of the following three cases: the first linearly mover a11 is fixed and the second linearly mover a12 and the third linearly mover a13 are linearly moved; the second linearly mover a12 and the third linearly mover a13 are linearly moved in the opposite direction of a direction in which the first linearly mover a11 is linearly moved; and the second linearly mover a12 and the third linearly mover a13 are linearly moved by more than a projection amount of the first linearly mover a11 in the same direction as the direction in which the first linearly mover a11 is linearly moved.

It is more desirable to determine the projection amount according to distances and directions from the geometric center of the display panel for blue 40B in the linearly movers "a" of the three actuators 111, 112, and 113, in other words, coordinate points of the linearly movers "a".

Specifically, a triangle indicated by a broken line formed by contacts of the distal ends of the linearly movers "a" of the actuators 111, 112, and 113 and the first plate 101 is disposed along the XY plane. In the plan view from the positive Z direction, the geometrical center of the display panel for blue 40B is located on the inner side of the triangle in the plan view from the positive Z direction. Movement in the $\theta x$ direction is rotation in the $\theta x$ direction of the triangle. Therefore, when the second linearly mover a12 and the third linearly mover a13 are linearly moved by an equal projection amount in the positive Z direction, the movement in the $\theta x$ direction is counterclockwise rotation when viewed from the negative X direction.

On the other hand, when the second linearly mover a12 and the third linearly mover a13 are linearly moved by an equal projection amount in the negative Z direction, the movement in the $\theta x$ direction is clockwise rotation when viewed from the negative X direction. Consequently, it is possible to perform position adjustment for $\theta x$ one axis.

As shown in FIG. 10C, the second linearly mover a12 and the third linearly mover a13 are linearly moved in directions opposite to each other in the positive and negative Z directions relatively to the first linearly mover a11, whereby the first plate 101 moves in the $\theta y$ direction with respect to the second plate 201. As explained above, "relatively to the first linearly mover a11" indicates a projection amount of the second linearly mover a12 and the third linearly mover a13 with respect to a projection amount of the first linearly mover a11 and is not limited to when the first linearly mover a11 is fixed.

Specifically, the movement in the $\theta y$ direction is rotation in the $\theta y$ direction of the triangle indicated by the broken line. That is, when the second linearly mover a12 is linearly moved in the negative Z direction, which is the first direction, and the third linearly mover a13 is linearly moved in the positive Z direction, which is a second direction opposite to the first direction, the movement in the $\theta y$ direction is counterclockwise rotation when viewed from the positive Y direction. This state is shown in FIG. 10C.

On the other hand, when the second linearly mover a12 is linearly moved in the positive Z direction and the third linearly mover a13 is linearly moved in the negative Z direction, the movement in the $\theta y$ direction is clockwise rotation when viewed from the positive Y direction. Consequently, it is possible to perform position adjustment for $\theta y$ one axis.

The position adjustment for the three axes of $\theta x$, $\theta y$, and Z in the first plate 101 is achieved by performing the Z one-axis adjustment, the $\theta x$ one-axis adjustment, and the $\theta y$ one-axis adjustment in combination. The second plate 201 is coupled to the base 400 via the third plate 301 shown in FIG. 4. The base 400 is fixed to the cross dichroic prism 50. Further, the cross dichroic prism 50 is fixed to the projection lens 60.

Therefore, the movement with respect to the second plate 201 in the first plate 101 explained above is movement with respect to the cross dichroic prism 50 and the projection lens 60. Consequently, the position of the display panel for blue 40B mounted on the first plate 101 is moved with respect to the cross dichroic prism 50 and the projection lens 60 and the position adjustment for the three axes of $\theta x$, $\theta y$, and Z is achieved. In other words, the first plate 101 moves in the positive and negative Z directions, the $\theta x$ direction, and the $\theta y$ direction, whereby the position of the display panel for blue 40B with respect to the projection lens 60 changes. A focus of the projection lens 60 on the display panel for blue 40B is adjusted.

1.3.2. Adjusting Method for Three Axes of Y, X, and $\theta z$

Adjustment of three axes of Y, X, and $\theta z$ in the adjusting mechanism 7 in this embodiment includes adjustment of two axes of X and θz between the second stage 200 and the third stage 300 and adjustment of one axis of Y between the third stage 300 and the base 400.

Figure 11A:
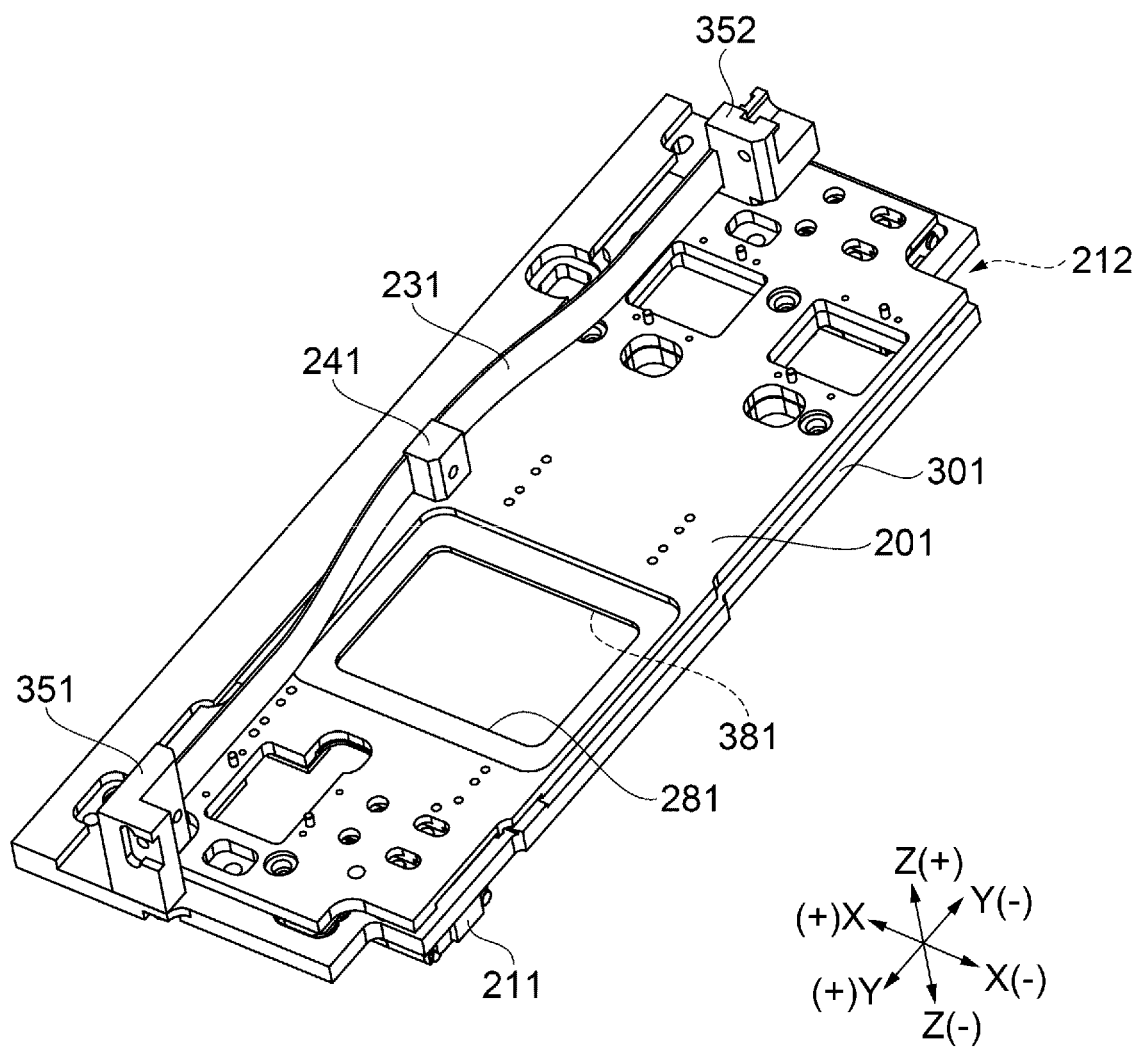
FIG. 11A is a perspective view showing the third plate and the second plate placed on the third plate.
Figure 11B:
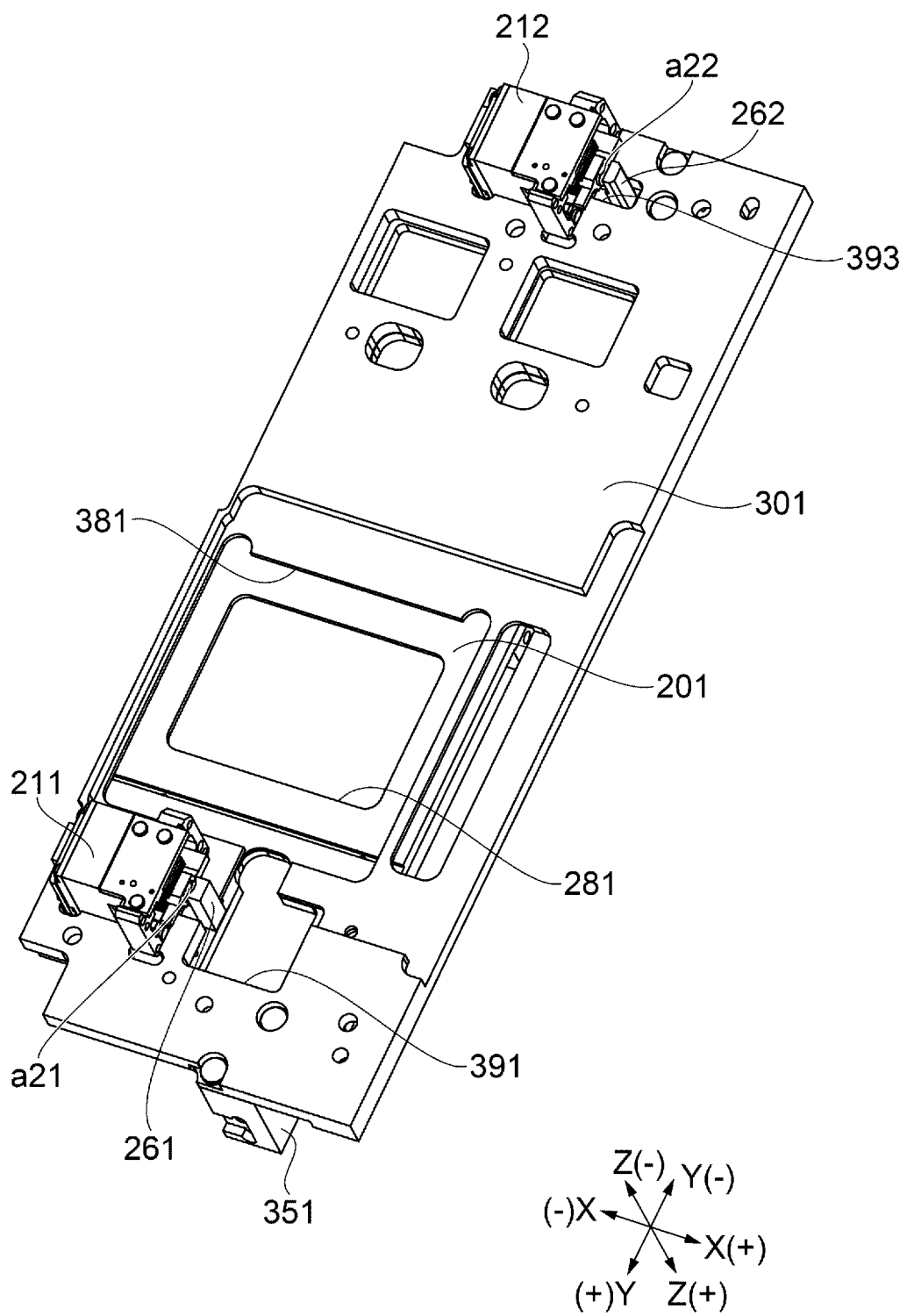
FIG. 11B is a perspective view showing the third plate and the second plate placed on the third plate.
Figure 12A:
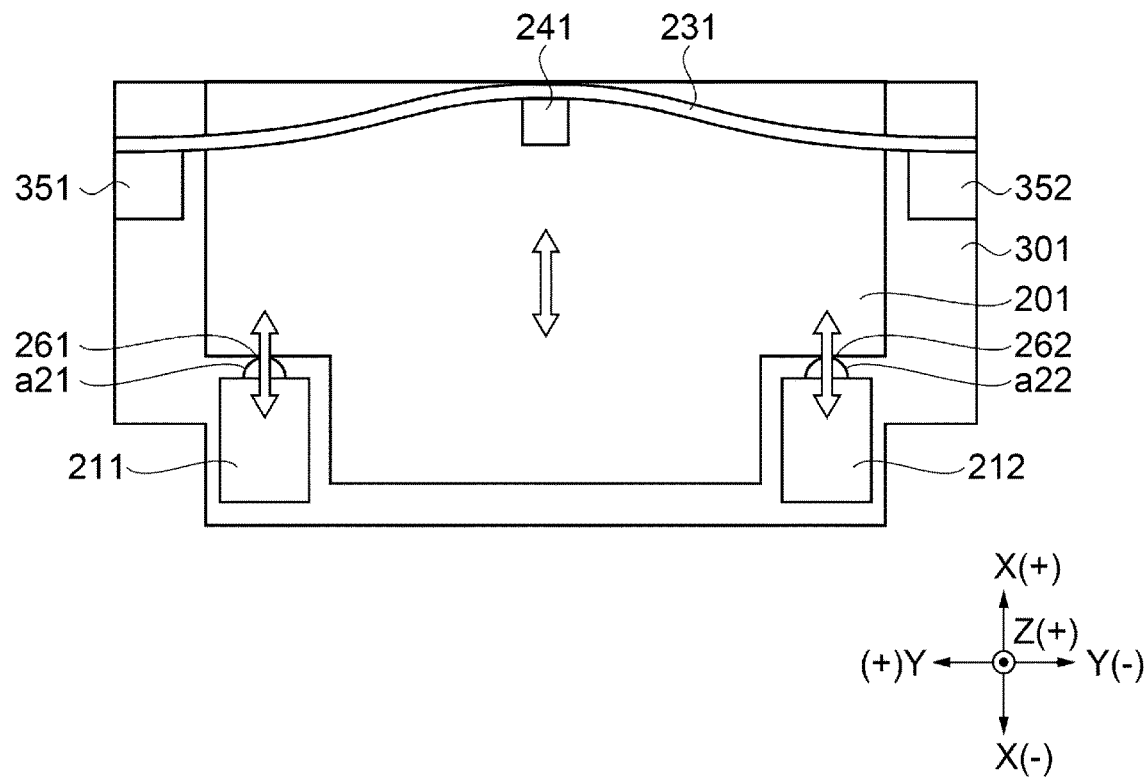
FIG. 12A is a schematic plan view showing an X one-axis adjusting method.
Figure 12B:
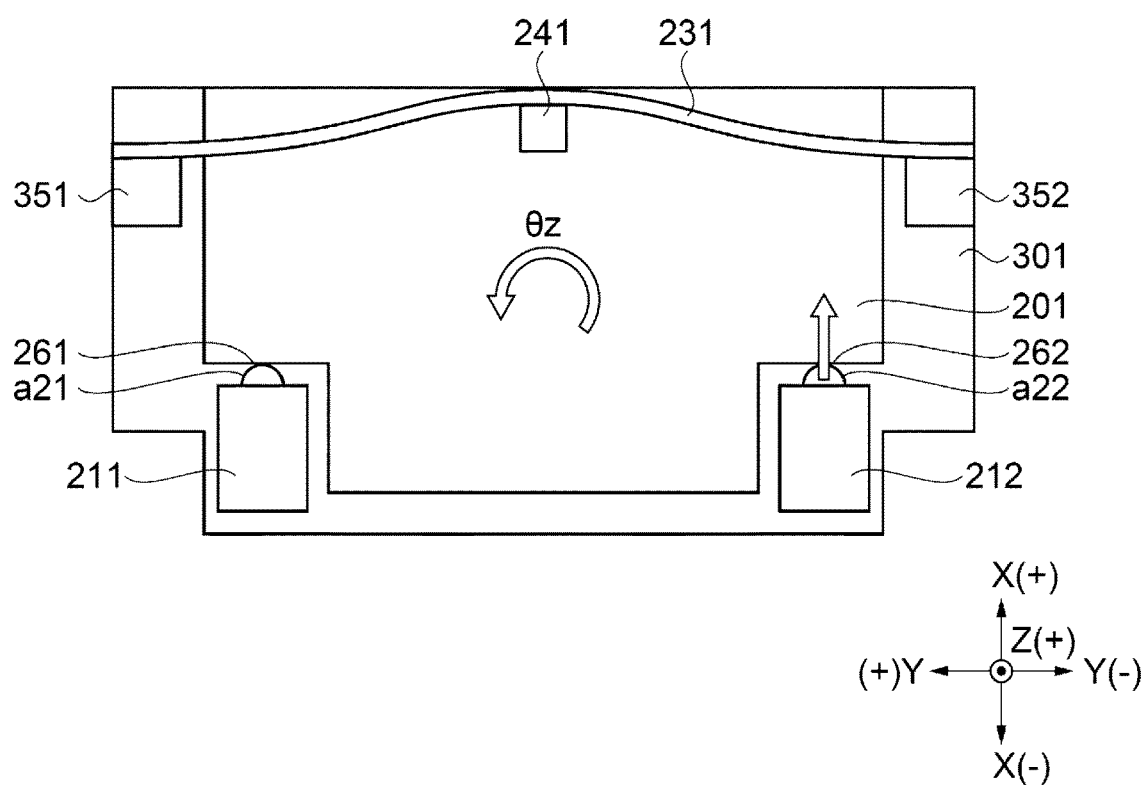
FIG. 12B is a schematic plan view showing a θz one-axis adjusting method.

First, an adjustment method for the two axes of X and θz in the second stage 200 and the third stage 300 is explained with reference to FIGS. 11A, 11B, 12A, and 12B. FIGS. 11A and 11B are perspective views showing the third plate 301 and the second plate 201 placed on the third plate 301. FIG. 12A is a schematic plan view showing an X one-axis adjusting method. FIG. 12B is a schematic plan view showing a θz one-axis adjusting method. FIG. 11B shows a state in which the second plate 201 and the third plate 301 are viewed from the negative Z-direction side, which is the rear surface side of FIG. 11A. In FIGS. 12A and 12B, components are schematically shown in the plan view from the positive Z direction.

As shown in FIG. 11A, when the third plate 301 and the second plate 201 are assembled, the coupling section 241 of the second plate 201 and the pair of contact portions 351 and 352 of the third plate 301 are coupled via the first elastic member 231. As shown in FIG. 11B, the actuator 211 functioning as the second actuator 210 includes a first linearly mover a21 and the actuator 212 includes a second linearly mover a22. In other words, the second actuator 210 includes the first linearly mover a21 and the second linearly mover a22. The first linearly mover a21 and the second linearly mover a22 come into contact with the second plate 201.

In an initial state in which the first linearly mover a21 and the second linearly mover a22 of the second actuator 210 are not linearly moving, a preload is applied to the first elastic member 231 in the positive X direction, which is one direction along the X axis. Specifically, the substantial center in the longitudinal direction of the first elastic member 231 is coupled to the coupling section 241. Both the end portions in the longitudinal direction of the first elastic member 231 are respectively coupled to the contact portions 351 and 352. In the first elastic member 231, a position coupled to the coupling section 241 is closer to the positive X direction than positions coupled to the contact portions 351 and 352 when viewed from the positive Y direction. Accordingly, in the plan view from the positive Z direction, the first elastic member 231 is disposed to be bent in a convex shape in the positive X direction with a vertex set in a position coupled to the coupling section 241.

As shown in FIG. 11B, a projecting section 261 of the second plate 201 is disposed to project in the negative Z direction from the opening section 391 of the third plate 301. A projecting section 262 of the second plate 201 is disposed to project in the negative Z direction from an opening section 393 of the third plate 301.

The first linearly mover a21 and the second linearly mover a22 are disposed to face the positive X direction and come into contact with the second plate 201. Specifically, the first linearly mover a21 of the actuator 211 comes into contact with the projecting section 261 of the second plate 201 from the negative X direction, which is the other direction along the X axis. The second linearly mover a22 of the actuator 212 comes into contact with the projecting section 262 of the second plate 201 from the negative X direction.

The first linearly mover a21 and the second linearly mover a22 project in the positive X direction to thereby press the second plate 201 in the positive X direction via the projecting sections 261 and 262. In the plan view from the positive Z direction, the opening sections 391 and 393 are formed in sizes for enabling the projecting sections 261 and 262 to move in the positive and negative X directions by being pressed by the first linearly mover a21 and the second linearly mover a22.

As shown in FIG. 12A, in the plan view from the positive Z direction, the first elastic member 231 and the pair of actuators 211 and 212 are disposed to be opposed in the positive and negative X directions. When the first linearly mover a21 and the second linearly mover a22 linearly move in the positive X direction by an equal projection amount and press the projecting sections 261 and 262, projection amounts of the first linearly mover a21 and the second linearly mover a22 are equal. Accordingly, the second plate 201 moves in the positive X direction resisting elastic repulsion of the first elastic member 231.

On the other hand, when the projection amounts of the first linearly mover a21 and the second linearly mover a22 are attenuated from the state in which the second plate 201 moves in the positive X direction, the second plate 201 moves in the negative X direction with the elastic repulsion of the first elastic member 231. Consequently, the second plate 201 moves in the positive and negative X directions with respect to the third plate 301. Consequently, it is possible to perform the position adjustment for the X one axis.

Since the preload is applied to the first elastic member 231 in the positive X direction, a backlash in the first elastic member 231 decreases compared with when the preload is not applied. Consequently, it is possible to improve responsiveness of the movement of the second plate 201 with respect to the linear movement, that is, the projection of the first linearly mover a21 and the second linearly mover a22.

The pair of actuators 211 and 212 is individually operable. Accordingly, it is also possible to individually set the projection amounts in the positive and negative X directions in the first linearly mover a21 and the second linearly mover a22.

When the projection amount in the positive and negative X directions of the first linearly mover a21 and the projection amount in the positive and negative X directions of the second linearly mover a22 are differentiated, the second plate 201 moves in the clockwise or counterclockwise θz direction with respect to the third plate 301.

Specifically, as shown in FIG. 12B, when the actuator 211 is fixed and is not operated and the second linearly mover a22 of the actuator 212 is linearly moved in the positive X direction, the second linearly mover a22 of the actuator 212 presses the second plate 201 in the positive X direction via the projecting section 262. Consequently, the second plate 201 moves in the counterclockwise θz direction with respect to the third plate 301 in the plan view from the positive Z direction.

On the other hand, when the actuator 212 is fixed and is not operated and the first linearly mover a21 of the actuator 211 is linearly moved in the positive X direction, the first linearly mover a21 of the actuator 211 presses the second plate 201 in the positive X direction via the projecting section 261. Consequently, the second plate 201 moves in the clockwise θz direction with respect to the third plate 301 in the plan view from the positive Z direction. Consequently, it is possible to perform the position adjustment for the θz one axis.

A method of differentiating the projection amount in the positive and negative X directions of the first linearly mover a21 and the projection amount in the positive and negative X directions of the second linearly mover a22 is not limited to not operating one of the actuators 211 and 212. To differentiate the two projection amounts, both of the actuators 211 and 212 may be operated to differentiate the projection amounts.

Figure 13:
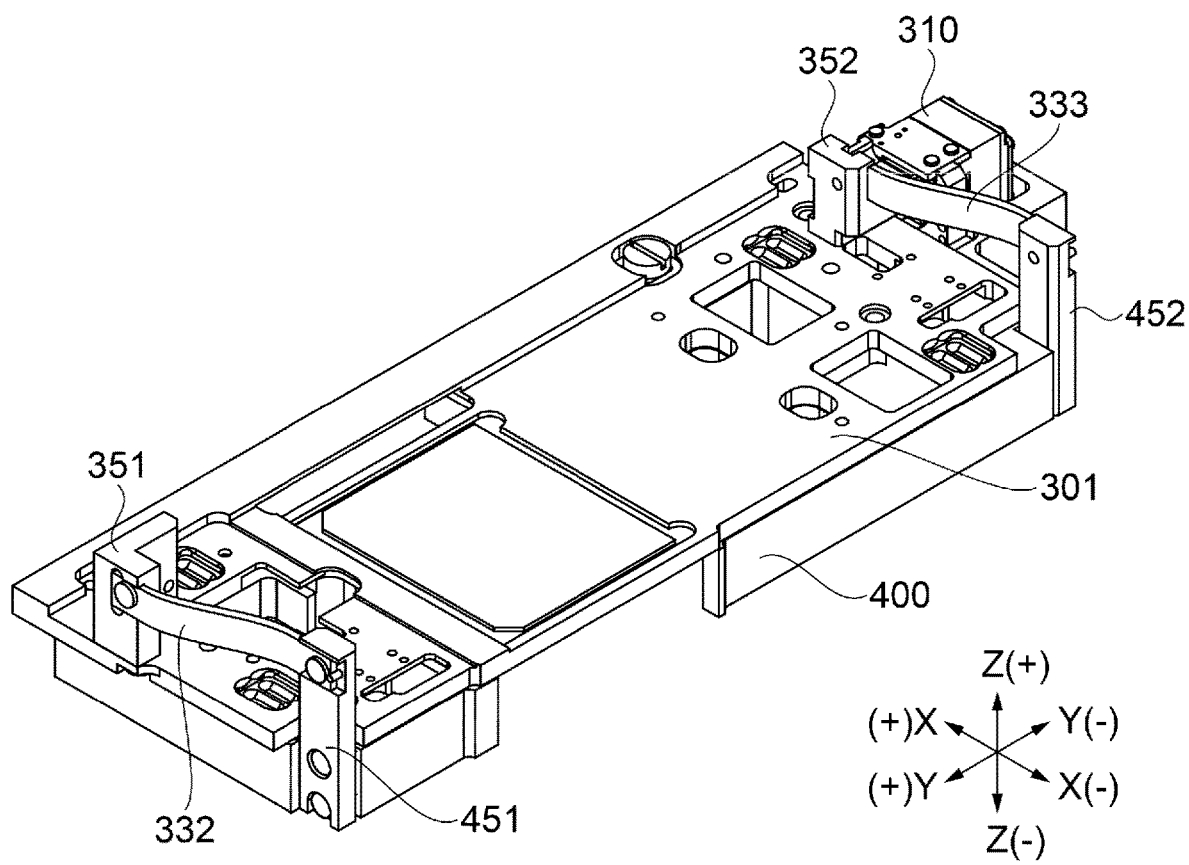
FIG. 13 is a perspective view showing the base and the third plate placed on the base.
Figure 14:
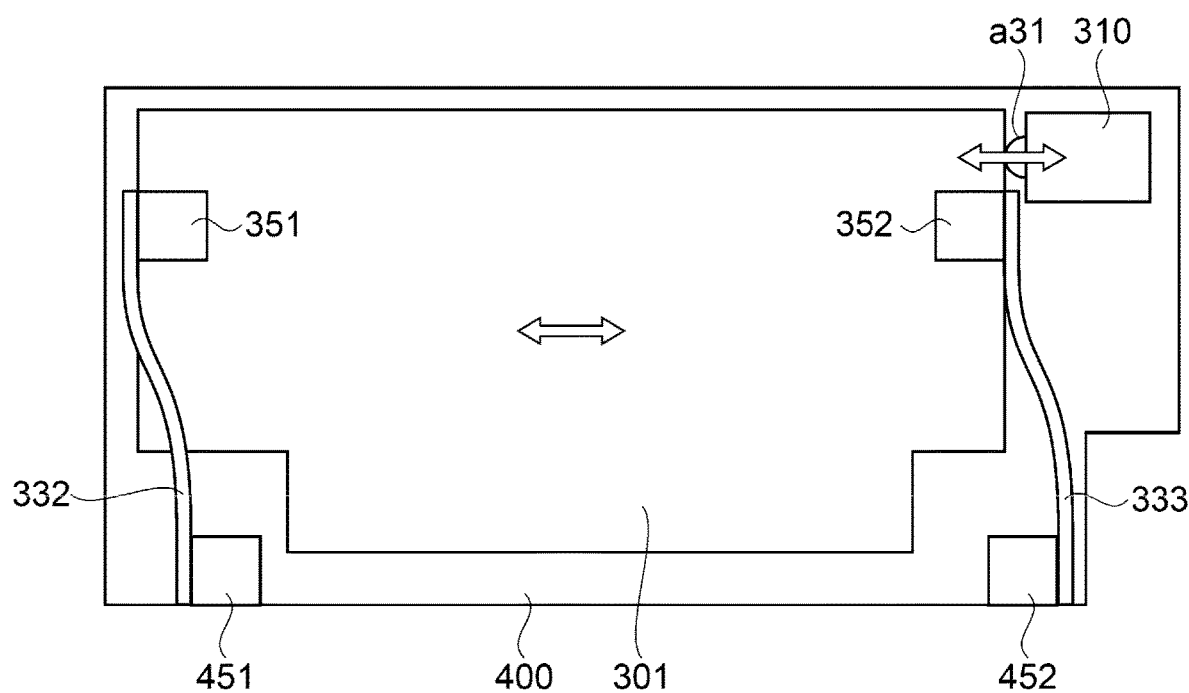
FIG. 14 is a schematic plan view showing a Y one-axis adjusting method.

An adjusting method for Y one axis in the third stage 300 and the base 400 is explained with reference to FIGS. 13 and 14. FIG. 13 is a perspective view showing the base 400 and the third plate 301 placed on the base 400. FIG. 14 is a schematic plan view showing the Y one-axis adjusting method. In FIG. 14, components are schematically shown in the plan view from the positive Z direction.

As shown in FIG. 13, when the base 400 and the third plate 301 are assembled, the contact portion 351 and the coupling section 451 are coupled and the contact portion 352 and the coupling section 452 are coupled via the second elastic member 332 and the third elastic member 333. Consequently, the second elastic member 332 and the third elastic member 333 couple the base 400 and the third plate 301 and restrict the movement of the third plate 301 with respect to the base 400 in the positive and negative Y directions.

A preload is applied to the second elastic member 332 in the positive Y direction in an initial state in which the third plate 301 is not pressed by the third actuator 310. Specifically, when viewed from the negative X direction, a position to which one end of the second elastic member 332 is coupled in the contact portion 351 is closer to the positive Y direction than a position to which the other end of the second elastic member 332 is coupled in the coupling section 451.

A preload is applied to the third elastic member 333 in the positive Y direction in an initial state in which the third plate 301 is not pressed by the third actuator 310. Specifically, when viewed from the negative X direction, a position to which one end of the third elastic member 333 is coupled in the contact portion 352 is closer to the positive Y direction than a position to which the other end of the third elastic member 333 is coupled in the coupling section 452.

The second elastic member 332 and the third elastic member 333 are disposed to be bent in a substantial S shape in the plan view from the positive Z direction in the initial state by the preload.

As shown in FIG. 14, in the plan view from the positive Z direction, a linearly mover a31 of the third actuator 310 is disposed to be linearly movable in the positive and negative Y directions. When the linearly mover a31 comes into contact with and presses the third plate 301 from the negative Y direction, the third plate 301 moves in the positive Y direction resisting elastic repulsion of the second elastic member 332 and the third elastic member 333.

On the other hand, when the projection of the linearly mover a31 in the third actuator 310 is attenuated from the state in which the third plate 301 moves in the positive Y direction, the third plate 301 moves in the negative Y direction with the elastic repulsion of the second elastic member 332 and the third elastic member 333. Consequently, the third plate 301 moves in the positive and negative Y directions with respect to the base 400. Consequently, it is possible to perform the position adjustment for Y one axis.

Since the preload is applied to the second elastic member 332 and the third elastic member 333 in the positive Y direction, a backlash in the second elastic member 332 and the third elastic member 333 decreases compared with when the preload is not applied. Consequently, it is possible to improve responsiveness of the movement of the third plate 301 with respect to the linear movement of the linearly mover a31.

The position adjustment for the three axes of Y, X, and θz in the second plate 201 is achieved by performing the Y one-axis adjustment, the X one-axis adjustment, and the θz one-axis adjustment in combination. The display panel for blue 40B is mounted on the second plate 201 via the first plate 101. Accordingly, the position adjustment for the three axes of Y, X, and θz of the display panel for blue 40B is achieved with respect to the base 400. That is, the position of the display panel for blue 40B is moved with respect to the cross dichroic prism 50 and the projection lens 60 and the position adjustment for the three axes of Y, X, and θz is achieved. Consequently, pixel deviation adjustment between the display panel for blue 40B and the other display panels 40 is achieved.

With the configuration of the adjusting mechanism for blue 70 explained above, the position of the display panel for blue 40B can be adjusted in the six axes of θx, θy and Z and Y, X, and θz. As explained above, the adjusting mechanism for red 80 mounted with the display panel for red 40R has the same configuration as the configuration of the adjusting mechanism for blue 70. Accordingly, the position of the display panel for blue 40B can also be adjusted in the six axes of θx, θy and Z and Y, X, and θz by the adjusting mechanism for red 80.

Therefore, the position of the display panel for red 40R changes according to the movement of the first plate 101, the second plate 201, and the third plate not shown in the figures in the adjusting mechanism for red 80. The position of the display panel for blue 40B changes according to the movement of the first plate 101, the second plate 201, and the third plate 301 in the adjusting mechanism for blue 70. Consequently, in the projector 1, the display panel for red 40R and the display panel for blue 40B are positioned with respect to the display panel for green 40G. It is possible to perform focus adjustment and pixel deviation adjustment.

In this embodiment, the configuration is illustrated in which the first stage 100 for performing θxθyZ three-axis adjustment, the second stage 200 for performing Xθz two-axis adjustment, and the third stage 300 for performing Y one-axis adjustment are disposed in this order from the display panel for blue 40B toward the base 400. However, the disposition of the stages is not limited to this.

As explained above, with the adjusting mechanism 7 and the projector 1 according to this embodiment, the following effects can be obtained.

The positions of the display panel for blue 40B and the display panel for red 40R in the projector 1 can be adjusted in the six axes of θx, θy and Z and Y, X, and θz.

The three axes of θx, θy and Z are adjusted by the first stage 100. A focus of the projection lens 60 on the display panel for blue 40B can be adjusted. The three axes of Y, X, and θz are adjusted by the second stage 200 and the third stage 300. Pixel deviation between the display panel for blue 40B and the other display panels 40 can be adjusted. Therefore, it is possible to provide the projector 1 capable of performing focus adjustment and pixel deviation adjustment for the display panel 40.

Since the first plate 101 is disposed closer to the display panel for blue 40B than the second plate 201 and the third plate 301, even if the pixel deviation is adjusted in the three axes of Y, X, and θz, a focus for the three axes of θx, θy and Z does not deviate. That is, it is possible to respectively independently perform the focus adjustment and the pixel deviation adjustment.

When not only adjustment in a manufacturing process but also the focus adjustment and the pixel deviation adjustment are necessary because of the influence of aged deterioration, an environment of use, and the like, it is possible to perform the adjustment using the adjusting mechanism 7. That is, it is possible to satisfactorily maintain, for a long period, the quality of an image and the like projected from the projector 1.

The positions of the display panel for red 40R and the display panel for blue 40B are adjusted with respect to the display panel for green 40G. That is, in the projector 1 including the three display panels 40, that is, the display panel for green 40G, the display panel for red 40R, and the display panel for blue 40B, it is possible to adjust positions based on the display panel for green 40G.

The adjusting mechanism 7 adopts the leaf springs as the first elastic member 231, the second elastic member 332, and the third elastic member 333. Therefore, a guide is unnecessary. Consequently, it is possible to reduce the thickness in the positive and negative Z directions in the adjusting mechanism 7.

The first actuator 110, the second actuator 210, and the third actuator 310 adopt the piezoelectric element as the driving section 171. Accordingly, it is easy to reduce the actuators in size and weight. Therefore, the adjusting mechanism 7 can be reduced in size and weight, although the adjusting mechanism 7 includes a plurality of actuators. It is also easy to reduce projector 1 in size and weight.

Contents derived from the embodiment are described below.

An adjusting mechanism is an adjusting mechanism for adjusting a position of a display panel, the adjusting mechanism including: a first plate including a placing portion on which the display panel is placed; a second plate on which the first plate is placed, the second plate being disposed on an opposite side of the display panel side with respect to the first plate; a third plate on which the second plate is placed, the third plate being disposed on an opposite side of the first plate side with respect to the second plate; a first position adjusting actuator; a second position adjusting actuator; and a third position adjusting actuator. In a state in which the display panel is placed on the placing portion, when a surface parallel to a display surface of the display panel is set as a reference plane and a coordinate axis orthogonal to the reference plane is represented as a Z axis and coordinate axes orthogonal to each other in the reference plane are represented as an X axis and a Y axis and a rotating direction around the X axis is represented as a θx direction, a rotating direction around the Y axis is represented as a θy direction, and a rotating direction around the Z axis is represented as a θz direction, the first position adjusting actuator moves the first plate in a direction along the Z axis, the θx direction, and the θy direction, the second position adjusting actuator moves the second plate in a direction along the X axis and the θz direction, and the third position adjusting actuator moves the third plate in a direction along the Y axis.

With this configuration, it is possible to adjust the position of the display panel in six axes. Specifically, θxθyZ three-axis adjustment in the display panel is achieved by the first plate and the first position adjusting actuator. YXθz three-axis adjustment in the display panel is achieved by the second plate and the second position adjusting actuator and the third plate and the third position adjusting actuator. Therefore, it is possible to provide the adjusting mechanism that adjusts the position of the display panel in the projector in the six axes.

Since the first plate is disposed closer to the display panel than the second plate and the third plate, the three axes of θx, θy, and Z do not deviate even if the three axes of Y, X, and θz are adjusted. That is, it is possible to respectively independently perform the θxθyZ three-axis adjustment and the YXθz three-axis adjustment.

In the adjusting mechanism, the first position adjusting actuator may include a first actuator, a second actuator, and a third actuator, the first actuator may include a first linearly mover configured to linearly move in the direction along the Z axis, the second actuator may include a second linearly mover configured to linearly move in the direction along the Z axis, the third actuator may include a third linearly mover configured to linearly move in the direction along the Z axis, the first actuator may be disposed on one side with respect to the placing portion, and the second actuator and the third actuator may be disposed on another side opposite to the first actuator side with respect to the placing portion.

With this configuration, it is possible to adjust the position of the display panel in three axes. Specifically, the three actuators including the first actuator, the second actuator, and the third actuator are disposed at vertexes of a triangle surrounding the placing portion. Accordingly, the first linearly mover, the second linearly mover, and the third linearly mover of the three actuators are individually operated, whereby relative movement amounts of the three actuators change. The positions of the plates and the placing portion are adjusted and three-axis adjustment of the position of the display panel is achieved. Therefore, it is possible to provide the adjusting mechanism for adjusting the position of the display panel in the projector or the like in three axes.

In the adjusting mechanism, the first linearly mover, the second linearly mover, and the third linearly mover may come into contact with the first plate from the direction along the Z direction.

With this configuration, it is possible to adjust the position of the display panel in the three axes including the Z axis.

In the adjusting mechanism, the first actuator, the second actuator, and the third actuator may be disposed to be opposed to one another in the direction along the Y axis across the placing portion, and the first plate may move in the direction along the Z direction when the first linearly mover, the second linearly mover, and the third linearly mover are linearly moved in a same direction along the Z axis.

With this configuration, the first linearly mover, the second linearly mover, and the third linearly mover of the three actuators are individually linearly moved to change relative movement amounts in the three actuators. That is, it is possible to adjust the position of the display panel in the direction along the Z axis.

In the adjusting mechanism, the first plate may move in the θx direction when the second linearly mover and the third linearly mover are relatively linearly moved in a same direction along the Z axis with respect to the first linearly mover.

With this configuration, the first linearly mover, the second linearly mover, and the third linearly mover of the three actuators are individually linearly moved to change relative movement amounts in the three actuators. That is, it is possible to adjust the position of the display panel in the θx direction.

In the adjusting mechanism, the first plate may move in the θy direction when the second linearly mover is relatively linearly moved along a first direction along the Z direction with respect to the first linearly mover and the third linearly mover is relatively linearly moved along a second direction opposite to the first direction along the Z axis with respect to the first linearly mover.

With this configuration, the first linearly mover, the second linearly mover, and the third linearly mover of the three actuators are individually linearly moved to change relative movement amounts. That is, it is possible to adjust the position of the display panel in the θy direction.

In the adjusting mechanism, the adjusting mechanism may further include a first elastic member coupling the second plate and the third plate, and the first elastic member may be elastically deformable in the direction along the X axis.

With this configuration, it is possible to adjust the position of the display panel in the three axes of Y, X, and θz. Specifically, Xθz two-axis adjustment in the display panel is achieved by the second plate and the second position adjusting actuator. Y one-axis adjustment in the display panel is achieved by the third plate and the third position adjusting actuator. Therefore, it is possible to provide the adjusting mechanism for adjusting the position of the display panel in the projector or the like in three axes.

In the adjusting mechanism, the adjusting mechanism may further include: a base on which the third plate is placed, the base being disposed on an opposite side of the second plate side with respect to the third plate; and a second elastic member and a third elastic member provided to be opposed to each other in the direction along the Y axis, coupling the third plate and the base, and configured to restrict movement of the third plate in the direction along the Y axis with respect to the base.

With this configuration, when the third position adjusting actuator is operated to move the third plate, it is possible to move the third plate only in the direction along the Y axis. Compared with when a moving direction of the third plate is restricted using a guide, a space for setting the guide is unnecessary. It is possible to reduce the adjusting mechanism in size.

Further, the second elastic member and the third elastic member couple the third plate and the base. Therefore, when the third plate moves according to the operation of the third position adjusting actuator, a repulsive force is contained in the second elastic member and the third elastic member. Accordingly, when the operation of the third position adjusting actuator is released or an operation amount of the third position adjusting actuator is attenuated, the repulsive force acts to return the third plate to a position before the operation of the third position adjusting actuator. Consequently, it is possible to cause the third plate to reciprocate in the direction along the Y axis with respect to the base.

In the adjusting mechanism, the second position adjusting actuator may include a first actuator and a second actuator, the first actuator may include a first linearly mover configured to linearly move in the direction along the X axis, the second actuator may include a second linearly mover configured to linearly move in the direction along the X axis, and the first linearly mover and the second linearly mover may come into contact with the second plate.

With this configuration, the second position adjusting actuator can bring the two linearly mover, that is, the first linearly mover and the second linearly mover, into contact with the second plate.

In the adjusting mechanism, the first linearly mover and the second linearly mover may project in the direction along the X axis to press the second plate.

With this configuration, the second position adjusting actuator can individually project the first linearly mover and the second linearly mover to press the second plate in the direction along the X axis.

In the adjusting mechanism, the second plate may move in the direction along the X axis when a projection amount of the first linearly mover in the direction along the X axis and a projection amount of the second linearly mover in the direction along the X axis are equal.

With this configuration, it is possible to move the second plate in the direction along the X axis with respect to the third plate. When the second plate moves according to the operation of the second position adjusting actuator, a repulsive force is contained in the first elastic member. Accordingly, when the operation of the second position adjusting actuator is released or a projection amount of the second position adjusting actuator is attenuated, the repulsive force acts to return the second plate to a position before the operation of the second position adjusting actuator. Consequently, it is possible to cause the second plate to reciprocate in the direction along the X axis with respect to the third plate.

In the adjusting mechanism, the second plate may move in the θz direction when a projection amount of the first linearly mover in the direction along the X axis and a projection amount of the second linearly mover in the direction along the X axis are different.

With this configuration, it is possible to move the second plate in both clockwise and counterclockwise directions in the θz direction with respect to the third plate.

In the adjusting mechanism, the first elastic member may be applied with a preload in the direction along the X axis.

With this configuration, since the preload is applied to the first elastic member, a backlash in the first elastic member decreases compared with when the preload is not applied. Consequently, it is possible to improve responsiveness of the movement of the second plate with respect to the operation of the second position adjusting actuator.

In the adjusting mechanism, the third plate may include a pair of contact portions provided at both ends in the direction along the Y axis, the first elastic member may be a leaf spring, the first elastic member may be coupled to the third plate via the pair of contact portions and coupled to the second plate in a position of the first elastic member between the pair of contact portions in the direction along the Y axis, and the first actuator and the second actuator may be disposed to be opposed to the pair of contact portions and the first elastic member in the direction along the X axis.

With this configuration, it is easy to secure a space for mounting the display panel between a pair of second position adjusting actuators and the pair of contact portions and the first elastic member, which are disposed to be opposed to each other. Since the first elastic member is the leaf spring, a setting space of the first elastic member is small compared with other elastic members such as a coil spring. Consequently, it is possible to reduce the adjusting mechanism in size.

A projector according to an aspect includes: a light source; a display panel configured to modulate light emitted from the light source; a projection lens configured to project the light modulated by the display panel; and the adjusting mechanism on which the display panel is placed.

In the projector, a focus of the projection lens with respect to the display panel may be adjusted when the first plate moves in at least one direction among the direction along the Z axis, the θx direction, and the θy direction and changes a position of the display panel with respect to the projection lens.

With these configurations, three axes of θx, θy, and Z are adjusted by the first plate and the first position adjusting actuators. It is possible to adjust a focus of the projection lens on the display panel. Three axes of Y, X, and θz are adjusted by the second plate and the second position adjusting actuator and the third plate and the third position adjusting actuator. It is possible to adjust pixel deviation. Therefore, it is possible to provide a projector capable of performing focus adjustment for the display panel and pixel deviation adjustment.

Since the first plate is disposed closer to the display panel than the second plate and the third plate, a focus for the three axes of θx, θy, and Z does not deviate even if pixel deviation is adjusted in the three axes of Y, X, and θz. That is, it is possible to respectively independently perform the focus adjustment and the pixel deviation adjustment.

When the focus adjustment and the pixel deviation adjustment are necessary because of the influence of aged deterioration, an environment of use, and the like, it is possible to perform the adjustment using the adjusting mechanism. That is, it is possible to satisfactorily maintain, for a long period, the quality of an image and the like projected from the projector.

In the projector, the projector may further include, as the display panel, a display panel for green configured to modulate green light, a display panel for red configured to modulate red light, and a display panel for blue configured to modulate blue light and include, as the adjusting mechanism, an adjusting mechanism for red configured to adjust a position of the display panel for red and an adjusting mechanism for blue configured to adjust a position of the display panel for blue, and the projector may determine a position of the display panel for red and a position of the display panel for blue with respect to the display panel for green by changing the position of the display panel for red according to movement of the second plate and the third plate in the adjusting mechanism for red and changing the position of the display panel for blue according to movement of the second plate and the third plate in the adjusting mechanism for blue.

With this configuration, the positions of the display panel for red and the display panel for blue are adjusted with respect to the display panel for green. That is, in the projector including the three display panels, that is, the display panel for green, the display panel for red, and the display panel for blue, it is possible to adjust positions based on the display panel for green.

In the projector, the projector may further include a color combination optical system configured to combine lights respectively emitted from the display panel for red, the display panel for green, and the display panel for blue, and, among the first plate, the second plate, and the third plate, the third plate may be located on a nearest side to the color combination optical system and the first plate may be located on a farthest side from the color combination optical system.

With this configuration, the first plate is disposed further away from the color combination optical system than the second plate and the third plate. That is, the first plate can be disposed closer to the display panel than the second plate and the third plate. Consequently, even if pixel deviation is adjusted in the three axes of Y, X, and θz, a focus for the three axes of θx, θy, and Z does not deviate.

An adjusting mechanism according to an aspect is an adjusting mechanism for adjusting a position of a display panel, the adjusting mechanism including: a plate including a placing portion on which the display panel is placed; a first actuator configured to come into contact with the plate and move the plate; a second actuator configured to come into contact with the plate and move the plate; and a third actuator configured to come into contact with the plate and move the plate. The first actuator includes a first linearly mover configured to linearly move in a predetermined direction, the second actuator includes a second linearly mover configured to linearly move in the predetermined direction, the third actuator includes a third linearly mover configured to linearly move in the predetermined direction, the first actuator is disposed on one side with respect to the placing portion, and the second actuator and the third actuator are disposed on another side opposite to the first actuator side with respect to the placing portion.

With this configuration, it is possible to adjust the position of the display panel in three axes. Specifically, the first actuator, the second actuator, and the third actuator are disposed at vertexes of a triangle surrounding the placing portion. Accordingly, the first linearly mover, the second linearly mover, and the third linearly mover of the three actuators are individually operated, whereby relative movement amounts in the three actuators change. The positions of the plates and the placing portion are adjusted and three-axis adjustment of the position of the display panel is achieved. Therefore, it is possible to provide the adjusting mechanism for adjusting the position of the display panel in the projector or the like in three axes.

An adjusting mechanism according to an aspect is an adjusting mechanism for adjusting a position of a display panel, the adjusting mechanism including: a first plate including a placing portion on which the display panel is placed; a second plate on which the first plate is placed, the second plate being disposed on an opposite side of the display panel side with respect to the first plate; a third plate on which the second plate is placed, the third plate being disposed on an opposite side of the first plate side with respect to the second plate; a first position adjusting actuator; a second position adjusting actuator; and a first elastic member coupling the second plate and the third plate. When coordinate axes orthogonal to each other in a display surface of the display panel are represented as an X axis and a Y axis, a coordinate axis orthogonal to the display surface is represented as a Z axis, and a rotating direction around the Z axis is represented as a θz direction, the first position adjusting actuator moves the second plate in a direction along the X axis and the θz direction, the second position adjusting actuator moves the third plate in a direction along the Y axis, and the first elastic member is elastically deformable in the direction along the X axis.

With this configuration, it is possible to adjust the position of the display panel in three axes of Y, X, and θz. Specifically, Xθz two-axis adjustment in the display panel is achieved by the second plate and the second position adjusting actuator. Y one-axis adjustment in the display panel is achieved by the third plate and the third position adjusting actuator. Therefore, it is possible to provide the adjusting mechanism for adjusting the position of the display panel in the projector or the like in three axes.

What is claimed is:

1. An adjusting mechanism for adjusting a position of a display panel, the adjusting mechanism comprising:
   a first plate including a placing portion on which the display panel is placed;
   a second plate on which the first plate is placed, the second plate being disposed on an opposite side of a display panel side with respect to the first plate;
   a third plate on which the second plate is placed, the third plate being disposed on an opposite side of a first plate side with respect to the second plate;
   a first position adjusting actuator;

a second position adjusting actuator; and
a third position adjusting actuator, wherein:
in a state in which the display panel is placed on the placing portion, a surface parallel to a display surface of the display panel is a reference plane, a coordinate axis orthogonal to the reference plane is a Z axis, two coordinate axes orthogonal to each other in the reference plane are an X axis and a Y axis, a rotating direction around the X axis is a θx direction, a rotating direction around the Y axis is a θy direction, and a rotating direction around the Z axis is a θz direction,
the first position adjusting actuator is configured to move the first plate in a direction along the Z axis, the θx direction, and the θy direction,
the second position adjusting actuator is configured to move the second plate in a direction along the X axis and the θz direction, and
the third position adjusting actuator is configured to move the third plate in a direction along the Y axis.

2. The adjusting mechanism according to claim 1, wherein:
the first position adjusting actuator includes a first actuator, a second actuator, and a third actuator,
the first actuator includes a first linearly mover configured to linearly move in the direction along the Z axis,
the second actuator includes a second linearly mover configured to linearly move in the direction along the Z axis,
the third actuator includes a third linearly mover configured to linearly move in the direction along the Z axis,
the first actuator is disposed on one side with respect to the placing portion, and
the second actuator and the third actuator are disposed on another side opposite to a first actuator side with respect to the placing portion.

3. The adjusting mechanism according to claim 2, wherein the first linearly mover, the second linearly mover, and the third linearly mover come into contact with the first plate from the direction along the Z direction.

4. The adjusting mechanism according to claim 3, wherein
the first actuator, the second actuator, and the third actuator are disposed to be opposed to one another in the direction along the Y axis across the placing portion, and
the first plate moves in the direction along the Z direction when the first linearly mover, the second linearly mover, and the third linearly mover are linearly moved in a same direction along the Z axis.

5. The adjusting mechanism according to claim 3, wherein the first plate moves in the θx direction when the second linearly mover and the third linearly mover are relatively linearly moved in a same direction along the Z axis with respect to the first linearly mover.

6. The adjusting mechanism according to claim 3, wherein the first plate moves in the θy direction when the second linearly mover is relatively linearly moved along a first direction along the Z direction with respect to the first linearly mover and the third linearly mover is relatively linearly moved along a second direction opposite to the first direction along the Z axis with respect to the first linearly mover.

7. The adjusting mechanism according to claim 1, further comprising
a first elastic member coupling the second plate and the third plate, wherein the first elastic member is elastically deformable in the direction along the X axis.

8. The adjusting mechanism according to claim 7, further comprising:
a base on which the third plate is placed, the base being disposed on an opposite side of a second plate side with respect to the third plate; and
a second elastic member and a third elastic member which are provided to be opposed to each other in the direction along the Y axis, the second elastic member and the third elastic member being coupling the third plate and the base, and configured to restrict movement of the third plate in the direction along the Y axis with respect to the base.

9. The adjusting mechanism according to claim 7, wherein:
the second position adjusting actuator includes a first actuator and a second actuator,
the first actuator includes a first linearly mover configured to linearly move in the direction along the X axis,
the second actuator includes a second linearly mover configured to linearly move in the direction along the X axis, and
the first linearly mover and the second linearly mover come into contact with the second plate.

10. The adjusting mechanism according to claim 9, wherein the first linearly mover and the second linearly mover project in the direction along the X axis to press the second plate.

11. The adjusting mechanism according to claim 10, wherein the second plate moves in the direction along the X axis when a projection amount of the first linearly mover in the direction along the X axis and a projection amount of the second linearly mover in the direction along the X axis are substantially equal.

12. The adjusting mechanism according to claim 10, wherein the second plate moves in the θz direction when a projection amount of the first linearly mover in the direction along the X axis and a projection amount of the second linearly mover in the direction along the X axis are different.

13. The adjusting mechanism according to claim 7, wherein the first elastic member is applied with a preload in the direction along the X axis.

14. The adjusting mechanism according to claim 9, wherein:
the third plate includes a pair of contact portions provided at both ends in the direction along the Y axis,
the first elastic member is a leaf spring,
the first elastic member is coupled to the third plate via the pair of contact portions and coupled to the second plate in a position of the first elastic member between the pair of contact portions in the direction along the Y axis, and
the first actuator and the second actuator are disposed to be opposed to the pair of contact portions and the first elastic member in the direction along the X axis.

15. A projector comprising:
a light source;
a display panel configured to modulate light emitted from the light source;
a projection lens configured to project the light modulated by the display panel; and
the adjusting mechanism according to claim 1 on which the display panel is placed.

16. The projector according to claim 15, wherein a focus of the projection lens with respect to the display panel is adjusted when the first plate moves in at least one direction among the direction along the Z axis, the θx direction, and the θy direction and changes a position of the display panel with respect to the projection lens.

17. The projector according to claim 15, further comprises:
a display panel for green configured to modulate green light as the display panel;
a display panel for red configured to modulate red light as the display panel;
a display panel for blue configured to modulate blue light as the display panel;
an adjusting mechanism for red configured to adjust a position of the display panel for red as the adjusting mechanism; and
an adjusting mechanism for blue configured to adjust a position of the display panel for blue as the adjusting mechanism,
wherein a position of the display panel for red and a position of the display panel for blue with respect to the display panel for green are determined by changing the position of the display panel for red according to movement of the second plate and the third plate in the adjusting mechanism for red and changing the position of the display panel for blue according to movement of the second plate and the third plate in the adjusting mechanism for blue.

18. The projector according to claim 17, further comprising
a color combination optical system configured to combine lights respectively emitted from the display panel for red, the display panel for green, and the display panel for blue, and
among the first plate, the second plate, and the third plate, the third plate out of the three plates is located on a nearest side to the color combination optical system and the first plate out of the three plates is located on a farthest side from the color combination optical system.

19. An adjusting mechanism for adjusting a position of a display panel, the adjusting mechanism comprising:
a plate including a placing portion on which the display panel is placed;
a first actuator configured to come into contact with the plate and move the plate;
a second actuator configured to come into contact with the plate and move the plate; and
a third actuator configured to come into contact with the plate and move the plate, wherein:
the first actuator includes a first linearly mover configured to linearly move in a predetermined direction,
the second actuator includes a second linearly mover configured to linearly move in the predetermined direction,
the third actuator includes a third linearly mover configured to linearly move in the predetermined direction,
the first actuator is disposed on one side with respect to the placing portion, and
the second actuator and the third actuator are disposed on another side opposite to a first actuator side with respect to the placing portion.

20. An adjusting mechanism for adjusting a position of a display panel, the adjusting mechanism comprising:
a first plate including a placing portion on which the display panel is placed;
a second plate on which the first plate is placed, the second plate being disposed on an opposite side of the display panel side with respect to the first plate;
a third plate on which the second plate is placed, the third plate being disposed on an opposite side of a first plate side with respect to the second plate;
a first position adjusting actuator;
a second position adjusting actuator; and
a first elastic member coupling the second plate and the third plate, wherein:
in a display surface of the display panel, two coordinate axes orthogonal to each other are an X axis and a Y axis, a coordinate axis orthogonal to the display surface is a Z axis, and a rotating direction around the Z axis is a θz direction,
the first position adjusting actuator moves the second plate in a direction along the X axis and the θz direction,
the second position adjusting actuator moves the third plate in a direction along the Y axis, and
the first elastic member is elastically deformable in the direction along the X axis.

\* \* \* \* \*